(12) United States Patent
Yamashita et al.

(10) Patent No.: US 6,510,709 B1
(45) Date of Patent: Jan. 28, 2003

(54) SHAPING MOLD OPTICAL FIBER GUIDE BLOCK PROCESSES FOR THE PRODUCTION THEREOF AND OPTICAL FIBER ARRAY

(75) Inventors: Teruo Yamashita, Tokyo (JP); Kaoru Kagami, Tokyo (JP); You Ohgami, Kanagawa (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/348,278

(22) Filed: Jul. 7, 1999

Related U.S. Application Data
(60) Provisional application No. 60/092,417, filed on Jul. 10, 1998.

(30) Foreign Application Priority Data

Jan. 25, 1999 (JP) .......................................... 11-015428
Feb. 8, 1999 (JP) .......................................... 11-029723

(51) Int. Cl.⁷ .......................................... C03B 37/023
(52) U.S. Cl. .......................... 65/385; 65/404; 65/406; 65/408; 65/38; 65/44; 65/55; 65/66; 65/102; 264/1.21; 264/1.25; 264/2.5; 264/219; 264/220; 425/398; 425/399; 425/412
(58) Field of Search .............................. 65/38, 44, 55, 65/66, 102, 385, 404, 406, 408; 264/1.21, 1.25, 2.5, 219, 220; 425/398, 399, 412

(56) References Cited

U.S. PATENT DOCUMENTS

| | | | |
|---|---|---|---|
| 2,297,337 A | * 9/1942 | Wiley | 65/44 |
| 2,347,556 A | * 4/1944 | Griffith | 65/44 |
| 5,265,184 A | * 11/1993 | Lebby et al. | |
| 5,620,634 A | * 4/1997 | Shahid | 264/219 |
| 5,719,978 A | * 2/1998 | Kakii | |
| 5,858,051 A | * 1/1999 | Komiyama et al. | 65/55 |
| 6,050,110 A | * 4/2000 | Yoshida et al. | 65/404 |
| 6,079,228 A | * 7/2000 | Tomisaka | 65/404 |
| 6,103,344 A | * 8/2000 | Ota et al. | |
| 6,105,395 A | * 8/2000 | Yoshida et al. | 65/404 |

FOREIGN PATENT DOCUMENTS

JP 6-289236 * 10/1994
JP 8-292332 * 11/1996

* cited by examiner

*Primary Examiner*—Michael Colaianni
(74) *Attorney, Agent, or Firm*—Nixon & Vanderhye

(57) ABSTRACT

Disclosed are a shaping mold for producing an optical fiber guide block which permits highly accurate positioning and fixing of optical fibers, an optical fiber guide block having such excellent properties, processes for the production of these, and an optical fiber array. The shaping mold comprises an elevated region and a circumferential region adjacent to the elevated region, the elevated region having a plurality of convex portions designed for shaping the optical fiber fitting portions and having a side surface forming a boundary with the circumferential region, the boundary being positioned at a level lower than the level of bottoms of grooves formed between one convex portion and another convex portion, said side surface being an additional side surface different from side surfaces of any convex portions designed for shaping optical fiber fitting portions, the optical fiber guide block has a specific form produced by a mold shaping method using the above shaping mold, and the optical fiber array comprises the above optical fiber guide block.

9 Claims, 10 Drawing Sheets

SHAPING MOLD OPTICAL FIBER GUIDE BLOCK PROCESSES FOR THE PRODUCTION THEREOF AND OPTICAL FIBER ARRAY

This application claims priority over provisional application No. 60/092,417 filed Jul. 10, 1998.

BACKGROUND OF THE INVENTION

1. Field of the Invention

The present invention relates to a shaping mold, an optical fiber guide block, processes for the production thereof and an optical fiber array. More specifically, it relates to a shaping mold for producing an optical fiber guide block which permits highly accurate positioning and fixing of all of a plurality of optical fibers, a process for the production thereof, an optical fiber guide block having the above excellent properties, a process for the production thereof, and an optical fiber array in which all of a plurality of optical fibers are highly accurately positioned and fixed in an optical fiber guide block.

2. Description of Related Art

For optically connecting a plurality of optical fibers to a plurality of optical fibers or connecting a plurality of optical fibers to one or a plurality of optical parts, it is desirable to carry out highly accurate pre-positioning and pre-fixing of each of optical fibers which are to be optically connected. For this purpose, many optical fiber guide blocks are used. An optical fiber guide block is a member for highly accurately pre-positioning and pre-fixing, for example, end portions of a plurality of optical fibers for optically connecting a plurality of the optical fibers to optical fibers or optical part(s).

The optical fiber guide block is a thin-sheet-shaped part having a predetermined number of optical fiber fitting portions formed on one surface thereof, which optical fiber fitting portions are used for positioning and fixing end portions of optical fibers. The optical fiber fitting portions are generally formed of grooves having a predetermined width and a predetermined depth each. The optical fiber guide block is largely classified into the following two types (1) and (2).

(1) An optical fiber guide block which is a thin-sheet-shaped member having a predetermined number of optical fiber fitting portions formed on one surface thereof, each optical fiber fitting portion extending from one side of the "one surface" to the other side or from the one side to predetermined positions on the "one surface".

(2) An optical fiber guide block having an optical fiber fixing region where optical fiber fitting portions are formed on the upper surface thereof and a low-level region having its upper surface positioned at a lower level than the level of the upper surface of the optical fiber fixing region.

In the optical fiber guide block of the above type (2), a predetermined number of optical fiber fitting portions are formed on the upper surface of the optical fiber fixing region, and each optical fiber fitting portion extends from a side (boundary) between the optical fiber fixing region and the low-level region to the other side which is opposite to the boundary side and is on the upper surface of the optical fiber fixing region, or from the boundary side to a predetermined position on the above upper surface. The low-level region works as a setting on which the coating portion of coated optical fibers (optical fibers protected with a coating) such as an optical fiber tape is to be fixed.

Conventionally, attempts have been made to produce optical fiber guide blocks of the above types by an etching method or a cutting method, while attempts are being actively made to produce them by a mold-shaping method in recent years. The mold-shaping method is promising as a method capable of providing optical fiber guide blocks having high accuracy of an external form and high accuracy of optical fiber fitting portions and having high stability with regard to the above accuracy properties with high productivity at low costs.

When an optical fiber guide block having a plurality of optical fiber fitting portions is produced by a mold-shaping method, conventionally, there is used a shaping mold having transfer shaping surfaces which are used for shaping the above optical fiber fitting portions and upper surfaces around a region of the optical fiber fitting portions (the above upper surfaces will be referred to as "sided upper surfaces" hereinafter). The above conventional shaping mold has a cross section, for example, as shown in FIG. 11(a). FIG. 11(a) is a schematic cross-sectional view of one example of conventional shaping molds. A shaping mold 80 shown in FIG. 11(a) has convex portions 81 for shaping a predetermined number of optical fiber fitting portions, and bottoms between adjacent convex portions 81 are at the same level as the level of shaping surfaces 82a and 82b to be used for shaping the sided upper surfaces (for example, see FIG. 4 of JP-A-8-292332).

When the above shaping mold 80 is used, an optical fiber guide block shown in FIG. 11(b) is obtained. FIG. 11(b) shows a schematic cross-sectional view of an optical fiber guide block 88 obtained by means of the shaping mold shown in FIG. 11(a). The optical fiber guide block 88 has a structure in which peak surfaces 86 present in boundaries between adjacent optical fiber fitting portions are substantially at the same level as the level of sided upper surfaces 87a and 87b.

Meanwhile, for complying with an increased density of an optical circuit, etc., in recent years, there is increasingly demanded an optical fiber array in which a plurality of optical fibers are positioned and fixed at intervals which are as close as possible. The above optical fiber array has an optical fiber guide block, a plurality of optical fibers positioned and fixed on the optical fiber guide block and a pressing member used for pressing and fixing the optical fibers to optical fiber fitting portions. With the above increasing demand, it is also increasingly demanded to form optical fiber fitting portions at intervals as close as possible in an optical fiber guide block for constituting the above optical fiber array.

As the pitch of a plurality of optical fiber fitting portions is decreased when the optical fiber fitting portions are formed, theoretically, there can be produced an optical fiber guide block which permits positioning and fixing of a predetermined number of the optical fibers in a state where circumferential surfaces of optical fibers located side by side are in contact with each other. When the circumferential surfaces of adjacent optical fibers are in contact with each other, however, there is no lubricity caused between the circumferential surfaces of the adjacent optical fibers, and it is therefore difficult to position and fix the optical fibers. Practically, therefore, it is desirable to give a gap of approximately several $\mu$m between the circumferential surfaces of the adjacent optical fibers.

When a plurality of optical fibers are positioned and fixed in a state where the circumferential surfaces of adjacent optical fibers are in contact with each other or in a state where the circumferential surfaces of adjacent optical fibers are apart from each other by the above gap of several μm, and when the peaks of boundary portions between the adjacent optical fiber fitting portions are substantially at the same level as the level of the sided upper surfaces, the amount of projection of the circumferential surfaces of the optical fibers (height of projected portions) measured from the level of the sided upper surfaces is large.

When an optical fiber array is produced by fitting a plurality of optical fibers in optical fiber fitting portions and pressing and fixing the optical fibers with a pressing member, therefore, there is formed a large gap between the optical fiber guide block and the pressing member, and an adhesive layer formed in the gap therefore has a large thickness. As a result, the adhesive layer is liable to peel off due to curing contraction or due to swelling caused by the absorption of water, which causes a problem that the reliability of the optical fiber array decreases. Further, each of optical fiber supporting positions of the optical fiber fitting portions is considerably low. That is, when cross sections of each optical fiber fitting portion and each optical fiber are taken in the direction perpendicular to the length direction thereof, the position of each of contact portions of the optical fiber fitting portions and the circumferential surfaces of the optical fibers is considerably lower than the center (optical axis) of each optical fiber, which causes a problem that the stability of the optical fibers which are once positioned is low.

The present inventors already found that when an optical fiber array comprising an optical fiber guide block, optical fibers and a pressing member which are fixed with an adhesive is produced, the above problems can be overcome by an optical fiber guide block having optical fiber fitting portions having a specific form shaped by cutting with one blade made of diamond (see JP-A-6-289236, particularly, FIG. 5(c) in the publication).

That is, it was found that the above problems can be overcome by an optical fiber array 95 shown in FIG. 12 (schematic front view of an optical fiber array). Specifically, the optical fiber array 95 is structured by providing an optical fiber guide block 92 having a predetermined number (for example, 4 in FIG. 12) of optical fiber fitting portions 91a to 91d in which peak surfaces of boundaries between adjacent optical fiber fitting portions are at a level lower than the level of the sided upper surfaces 90a and 90b and which optical fiber fitting portions 91a to 91d are formed by cutting with one diamond blade, fitting optical fibers 93a to 93d in the optical fiber fitting portions 91a to 91d and pressing and fixing the optical fibers 93a to 93d with an adhesive (not shown) and with a pressing member 94.

As already described, attempts are being actively made to produce optical fiber guide blocks by a mold shaping method in recent years. The optical fiber guide block having the above specific structure can be also produced by a mold shaping method. When the optical fiber guide block having the above specific structure is produced by a mold shaping method, generally, (1) the peak surface of each boundary between optical fiber fitting portions is easily rounded, and (2) the bottom of each optical fiber fitting portion is easily formed as an edge of two surfaces (inner surfaces of each optical fiber fitting portion), as compared with a case where a predetermined number of optical fiber fitting portion are formed by cutting.

For producing an optical fiber guide block by a mold shaping method, it is required to prepare a shaping mold having transfer shaping surfaces for shaping optical fiber fitting portions and sided upper surfaces (the mold having transfer shaping surfaces for shaping optical fiber fitting portions and sided upper surfaces will be referred to as "shaping mold I" hereinafter). For producing an optical fiber guide block having the above specific form, the shaping mold I (for example, FIG. 13 shows 4 convex portions for shaping optical fiber fitting portions, while the number of the convex portions shall not be limited to 4) can be relatively easily prepared by processing a flat-plate-shaped or block-shaped mold material with a double tapered grinder and a flat grinder according to steps shown in FIGS. 13(a) to 13(c).

FIGS. 13(a) to 13(c) show steps of preparing a shaping mold with one grinder with a view to attaining high productivity. FIG. 13(a) is a schematic front view of a mold material, etc., at the step of forming convex portions designed for shaping optical fiber fitting portions, FIG. 13(b) is a schematic front view of a mold material, etc., at the step of forming a circumferential region, and FIG. 13(c) is a schematic front view of a shaping mold obtained.

Specifically, as shown in FIG. 13(a), three grooves 103a, 103b and 103c are formed in one surface 101a of a mold material 101 with a double tapered grinder 102. The grooves 103a, 103b and 103c are substantially equivalent in depth. A boundary portion between the adjacent grooves 103a and 103b constitutes a convex portion 104a designed for shaping an optical fiber fitting portion, and a boundary portion between the adjacent grooves 103b and 103c constitutes a convex portion 104b designed for shaping an optical fiber fitting portion. In FIG. 13(a), a chain line $C_{10}$ shows an outer side surface of a convex portion 104c to be formed later (for shaping an optical fiber fitting portion), and a chain line $C_{11}$ shows an outer side surface of a convex portion 104d to be formed later (for shaping an optical fiber fitting portion).

Then, as shown in FIG. 13(b), the convex portion 104c for shaping an optical fiber fitting portion is formed outside the groove 103a which is located in the leftmost position when the mold material 101 is viewed in the length direction of the grooves 103a to 103c, and the convex portion 104d for shaping an optical fiber fitting portion is formed outside the groove 103c which is located in the rightmost position. That is, a groove having a predetermined depth is formed in a region 105a outside a portion which is to constitute the convex portion 104c, and a groove having a predetermined depth is formed in a region 105b outside a portion which is to constitute the convex portion 104d, with the above double tapered grinder 102.

The convex portions 104a to 104d designed for shaping optical fiber fitting portions are positioned on the upper surface side of an elevated region 106 having a predetermined thickness. When the above last two grooves are formed in the outside regions 105a and 105b, the double tapered grinder 102 is allowed to grind into the mold material 101 sufficiently deep so that the left-side surface of the convex portion 104c positioned in the leftmost position forms a substantially continuous surface with an upper surface of a region on the left side of the elevated region 106 and that the right-side surface of the convex portion 104d positioned in the rightmost position forms a substantially continuous surface with an upper surface of a region on the right side of the elevated region 106.

Then, remaining portions of the above regions 105a and 105b are removed with a flat grinder (not shown), to obtain a shaping mold shown in FIG. 13(c).

As described above, the convex portions 104a to 104d are formed, and the regions 105a and 105b outside the convex portions 104a to 104d are removed, whereby a shaping mold 108 (shown in FIG. 13(c)) can be relatively easily prepared. And, an optical fiber guide block having the above specific form can be obtained by a mold shaping method using the shaping mold 108 as a shaping mold I.

In FIG. 13(b), a chain line $C_{12}$ shows a position of upper surface of the circumferential region to be formed by removing the above outside region 105a, and a chain line $C_{13}$ shows positions of upper surface of the circumferential region to be formed by removing the above outside region 105b and a side surface of the elevated region 106 on the circumferential region side. In FIG. 13(c), 107a and 107b show upper surfaces of the circumferential regions, and the upper surfaces 107a and 107b work as shaping surfaces for transfer-shaping the sided upper surfaces of an optical fiber guide block.

However, when evaluated on the basis of a positioning accuracy of a plurality of optical fibers, an optical fiber guide block produced by a mold shaping method sing the above-prepared shaping mold is not satisfactory in form accuracy, since the grinder is allowed to grind into a mold material deeper for forming the left-side side surface the leftmost convex portion and the right-side side surface of the rightmost convex portion.

For example, in the shaping mold 108 shown in FIG. 13(c), left-side side surfaces of the convex portions 104a, 104b and 104d are formed by grinding with a substantially the same region of the double tapered grinder 102 during the grinding, and these left-side side surfaces are found to have substantially the same form when evaluated on the above basis. Since, however, the left-side side surface of the convex portion 104c is formed by grinding with a clearly different grinding surface of the double tapered grinder 102 during the grinding, the above left-side side surface of the convex portion 104c is found in many cases to constitute no "substantially the same form" when evaluated on the above basis. Similarly, right-side side surfaces of the convex portions 104a, 104b and 104c are found to have substantially the same form when evaluated on the above basis, while the right-side side surface of the convex portion 104d is found in many cases to constitute no "substantially the same form" as the form of the above right-side side surfaces of the convex portions 104a, 104b and 104c when evaluated on the above basis.

For example, the optical fiber guide block 92 shown in FIG. 12 is formed by a mold shaping method using the above shaping mold 108, and optical fibers 93a, 93b, 93c and 93d are fitted in the optical fiber fitting portions 91a, 91b, 91c and 91d of the optical fiber guide block 92. In this case, of support positions $P_{13}$ and $P_{14}$ of the optical fiber fitting portion 91B for the optical fiber 93b and support positions $P_{15}$ and $P_{16}$ of the optical fiber fitting portion 91c for the optical fiber 93c, the support positions $P_{13}$ and $P_{15}$ are on one level, and the support positions $P_{14}$ and $P_{16}$ are also on one level. However, the above support positions $P_{13}$ and $P_{15}$ are on one level, and a support position $P_{11}$ of the optical fiber fitting portion 91a for the optical fiber 93a and a support position $P_{17}$ of the optical fiber fitting portion 91d for the optical fiber 93d are on another (different) level in many cases. Similarly, the above support positions $P_{14}$ and $P_{16}$ on one leve, but a support position $P_{12}$ of the optical fiber fitting portion 91a for the optical fiber 93a and a support position $P_{18}$ of the optical fiber fitting portion 91d for the optical fiber 93d are on another (different) level in many cases.

As a result, when an optical fiber array 95 (see FIG. 12) is produced by fixing and pressing the optical fibers 93a to 93d to the optical fiber fitting portions of the optical fiber guide block 92 with a pressing member 94 (see FIG. 12) and with an adhesive, (1) the height (position of optical axis) of the optical fibers 93b and 93c from the level of a predetermined reference surface (e.g., sided upper surfaces 90a and 90b of the optical fiber guide block 92) differs from the height of the optical fibers 93a and 93d, or (2) the pitch between the optical fiber 93b and the optical fiber 93c differs from the pitch between the optical fiber 93a and the optical fiber 93b or from the pitch between the optical fiber 93c and the optical fiber 93d. It is therefore difficult in many cases to carry out highly accurate positioning and fixing of all of these optical fibers 93a to 93d.

DISCLOSURE OF THE INVENTION

Under the circumstances, it is a first object of the present invention to provide a shaping mold for producing an optical fiber guide block which permits highly accurate positioning and fixing of all of a plurality of optical fibers.

It is a second object of the present invention to provide a process for the production of the above shaping mold.

It is a third object of the present invention to provide an optical fiber guide block having the above excellent properties.

It is a fourth object of the present invention to provide a process for the production of the above optical fiber guide block.

It is a fifth object of the present invention to provide an optical fiber array comprising an optical fiber guide block which permits highly accurate positioning and fixing of all of a plurality of optical fibers.

For achieving the above objects, the present inventors have made diligent studies and have found the following. The above first and second objects can be achieved by a shaping mold of which the circumferential regions have their boundaries with the elevated region at a level lower than the level of bottoms of grooves formed between one convex portion and another convex portion of convex portions designed for shaping optical fiber fitting portions and of which the elevated region has additional side surface(s) different from side surfaces of the convex portions. The additional side surface refers to a side surface indicated, for example, by reference numeral $F_3$ in FIG. 3. Further, the above third and fourth objects can be achieved by mold-shaping a shapeable material into an optical fiber guide block having a predetermined structure with the above shaping mold.

Further, the above fifth object can be achieved by an optical fiber array comprising the above optical fiber guide block having a plurality of optical fiber fitting portions, and optical fibers pressed and fixed to the optical fiber fitting portions with a pressing member, at least the optical fiber guide block and the pressing member being fixed with an adhesive.

The present invention has been completed on the basis of the above findings.

That is, according to the present invention, the above first object is achieved by a shaping mold having transfer shaping surfaces for producing an optical fiber guide block having a plurality of optical fiber fitting portions in the form of grooves and side portions in the vicinities of a region where the optical fiber fitting portions are formed, the shaping mold comprising an elevated region and circumferential regions adjacent to the elevated region, the elevated region having a plurality of convex portions designed for shaping the optical fiber fitting portions and having side surfaces forming boundaries with circumferential regions, one boundary being present between one of said side surfaces and one circumferential region, the other boundary being present between the other of said side surfaces and the other circumferential region, the boundaries being positioned at a level or levels lower than the level of bottoms of grooves formed between one convex portion and another convex portion, said side surfaces being additional side surfaces different from side surfaces of any convex portions.

According to the present invention, the above second object is achieved by a process for the production of a shaping mold having transfer shaping surfaces for producing an optical fiber guide block having a plurality of optical fiber fitting portions in the form of grooves and side portions in the vicinities of a region where the optical fiber fitting portions are formed, the process comprising the steps of forming a plurality of convex portions in a mold material, the convex portions being designed for transfer-shaping the optical fiber fitting portions, and forming circumferential regions in the mold material, the step of forming the circumferential regions including the formation of side surfaces of an elevated region, which side surfaces are additional side surfaces different from side surfaces of any convex portions, the step of forming the circumferential regions further including the formation of boundaries one of which is present between one of the side surfaces of the elevated region and one circumferential region and the other is present between the other of the side surfaces of the elevated region and the other circumferential region, at a level or levels lower than the level of bottoms of grooves formed between one convex portion and another convex portion.

According to the present invention, the above third object is achieved by an optical fiber guide block comprising a region of a plurality of optical fiber fitting portions formed in one surface in the form of grooves and side regions adjacent to the region of the optical fiber fitting portions, the optical fiber guide block being formed by a mold-shaping method, the optical fiber fitting portions having boundaries between one optical fiber fitting portion and another optical fiber fitting portion, the boundaries having peaks or peak surfaces at a level lower than the level or levels of side region edges on the sides of the region of the optical fiber fitting portions, the side regions having additional side surfaces which are different from any optical-fiber-supporting side surfaces of the optical fiber fitting portions and which are on the side of the region of the optical fiber fitting portions. The "side region edge" refers, for example, to an edge of a sided upper surface 22a or 22b (horizontal surface) which is on the right side of the left "sided upper surface" or on the left side of the right "sided upper surface" in FIG. 4.

According to the present invention, the above fourth object of the present invention is achieved by a process for the production of an optical fiber guide block comprising a region of a plurality of optical fiber fitting portions in the form of grooves and side regions adjacent to the region of the optical fiber fitting portions by a mold shaping method, the process comprising providing the above shaping mold and mold-shaping a shapeable material into the optical fiber guide block with the shaping mold.

According to the present invention, the above fifth object of the present invention is achieved by an optical fiber array comprising the above optical fiber guide block, a predetermined number of optical fibers fitted in optical fiber fitting portions of the optical fiber guide block and a pressing member used for pressing and fixing the optical fibers to the optical fiber fitting portions, at least the optical fiber guide block and the pressing member being bonded and fixed to each other.

BRIEF DESCRIPTION OF DRAWINGS

FIG. 13(a) is a schematic front view of a mold material, etc., for showing the step of forming convex portions designed for shaping optical fiber fitting portions in a mold material, FIG. 13(b) is a schematic front view of the mold material, etc., for showing the step of forming a circumferential region in the mold material, and FIG. 13(c) is a schematic front view of an obtained shaping mold.

PREFERRED EMBODIMENTS OF THE INVENTION

Figure 1:
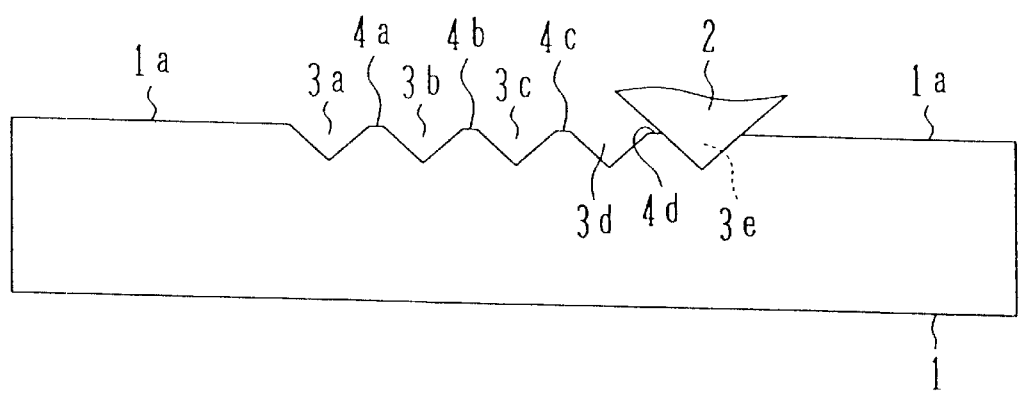
FIG. 1 is a schematic front view of a mold material, etc., for showing an example of the step of forming convex portions in the process for the production of a shaping mold in the present invention.

The shaping mold of the present invention has transfer shaping surfaces for producing an optical fiber guide block having a plurality of optical fiber fitting portions in the form of grooves and side portions in the vicinities of a region where the optical fiber fitting portions are formed, and the shaping mold comprises an elevated region and circumferential regions adjacent to the elevated region, the elevated region having a plurality of convex portions designed for shaping the optical fiber fitting portions and having side surfaces forming boundaries with the circumferential regions, one boundary being present between one of said side surfaces and one circumferential region, the other boundary being present between the other of said side surfaces and the other circumferential region, the boundaries being positioned at a level or levels lower than the level of bottoms of grooves formed between one convex portion and another convex portion, said side surfaces being additional side surfaces different from side surfaces of any convex portions.

The material for the shaping mold can be selected from materials depending upon an optical fiber guide block to be produced. For example, when the optical fiber guide block is formed of glass, the above material can be selected from cemented carbide, metal ceramic, vitreous carbon or ceramic. As required, the surface of the shaping mold on the transfer-shaping surface side is provided with a release film formed of a carbon-containing material, a platinum-alloy-containing material or a gold-alloy-containing material.

The transfer-shaping surfaces of the shaping mold of the present invention include upper surfaces and side surfaces of an elevated region and upper surfaces of circumferential regions adjacent to the elevated. A predetermined number of convex portions designed for shaping a plurality of optical fiber fitting portions are formed generally in parallel with each other or one another on the upper surface side of the elevated region.

In an optical fiber guide block, the optical fiber fitting portions extend from one side of a specific surface of the optical fiber guide block up to the other side opposite to the "one" side, or to predetermined positions on the specific surface.

In the shaping mold of the present invention, therefore, the elevated region and the convex portions for shaping optical fiber fitting portions extend in a length direction from a predetermined side of a transfer shaping surface.

The shaping mold of the present invention when viewed as a plan view has a form depending upon an optical fiber guide block to be produced, while it generally has a rectangular form.

In an optical fiber guide block, each optical fiber fitting portion, when its perpendicular cross section in the width direction thereof is taken (i.e., taken in the direction perpendicular to the length direction of the optical fiber fitting portions), has the form of a V-letter-shaped groove ("V groove" hereinafter), a groove formed by flattening the bottom of a V groove, a U-letter-shaped groove ("U groove" hereinafter), a groove formed by flattening the bottom of a U groove, or an arch. In the shaping mold of the present invention, therefore, the form of each of the convex portions for shaping optical fiber fitting portions can be selected depending upon the form of the optical fiber fitting portions to be produced.

In the shaping mold of the present invention, further, the number and the layout of the convex portions, the pitch between one convex portion to another adjacent convex portion, the forms of perpendicular cross sections of the convex portions in the width direction thereof and the size of each perpendicular cross section are properly determined depending upon the number and the layout of optical fiber fitting portions to be produced with the shaping mold, the pitch between one optical fiber fitting portion to another adjacent optical fiber fitting portion, the forms of perpendicular cross sections of the optical fiber fitting portions in the width direction thereof and the size of each cross section.

In an optical fiber guide block, generally, a predetermined number of optical fiber fitting portions which have substantially identical perpendicular cross-sectional forms in the width direction thereof and have substantially identical sizes of the cross sections are required to be formed in parallel at a predetermined pitch. Therefore, the shaping mold of the present invention generally has a layout in which a predetermined number of the convex portions designed for shaping the optical fiber fitting portions, which convex portions have substantially identical perpendicular cross-sectional forms in the width direction thereof and have substantially identical sizes of the cross sections, are formed in parallel at a predetermined pitch. Preferably, the form and size of the perpendicular cross section of each convex portion in the width direction thereof are determined to achieve the following. When optical fibers having the same diameters are positioned and fixed in a plurality of optical fiber fitting portions transfer-shaped with the convex portions, the height or depth of the circumferential surfaces measured from the level of an edge portion (on the optical fiber fitting portion side) of the sided upper surface shaped with the upper surface of the circumferential region is in the range of approximately $+D/2$ to $-D/10$ (in which D is a diameter of each optical fiber) as will be described later.

With regard to optical fibers positioned and fixed in the optical fiber guide block, the amount of projection (height of projected portion) or the amount of depression (depth) measured from the level of a predetermined reference (e.g., sided upper surface) will be referred to as "optical fiber level" hereinafter.

In the present specification, the above "a predetermined number of the convex portions designed for shaping the optical fiber fitting portions, which convex portions have substantially identical perpendicular cross-sectional forms in the width direction thereof and have substantially identical sizes of the cross sections" refer to a predetermined number of convex portions which are designed for shaping optical fiber fitting portions and are similar to each other or one another in perpendicular cross-sectional forms in the width direction thereof and in sizes of their perpendicular cross sections in the width direction thereof. That is, it refers to a predetermined number of convex portions which are formed to achieve the following. When optical fibers having the same outer diameters are fitted in a predetermined number of optical fiber fitting portions which are transfer-shaped with the convex portions at a transfer accuracy of approximately $\pm 0.5$ $\mu$m, the positional accuracy of each optical fiber does not exceed $\pm 1$ $\mu$m.

The above convex portions designed for forming optical fiber fitting portions are formed in an elevated region, and circumferential regions are adjacent to the elevated region. The upper surfaces of the circumferential regions work as shaping surfaces for transfer-shaping the sided upper surfaces of an optical fiber guide block. The upper surface of each circumferential region may be flat or ay be an uneven (concavo-convex) surface. The boundary between the elevated region and the circumferential region is required to be positioned at a level lower than the level of bottoms of grooves formed between the above convex portions.

The shaping mold of the present invention includes a shaping mold having one circumferential region. In this case, part of the elevated portion may be used as a shaping surface for transfer-shaping a sided upper surface.

However, when boundaries between optical fiber fitting portions of an optical fiber guide block are at the same level as, or at a level higher than the level of the above sided upper surface, the peaks of the boundaries are liable to be damaged when optical fibers fitted in the optical fiber fitting portions are pressed and fixed with a pressing member or when the optical fiber guide block is placed with the optical fiber fitting portions downward. Preferably, the shaping mold therefore has two circumferential regions, one on the left side of the elevated portion and the other on the right side of the elevated portion, when the elevated portion is viewed as a front view. Further, preferably, the two circumferential regions are at the same level.

In the present specification, "the elevated portion is viewed as a front view" means that the end portion of the shaping mold to be positioned where an optical connection side of an optical fiber guide block to be mold-shaped is positioned during the mold shaping. The "optical connection side" means a side where optical fibers on an optical fiber guide block as a product are connected to other optical fibers or an optical part.

The length of each circumferential region in the direction of the convex portions (grooves) is not critical. The above length is determined depending upon the form and use of an optical fiber guide block to be produced.

In the shaping mold having the elevated portion, a predetermined number of the convex portions designed for shaping optical fiber fitting portions and the circumferential regions, provided by the present invention, the elevated portion has additional side surfaces which are adjacent to the circumferential regions (one side surface adjacent to one circumferential region and the other side surface adjacent to the other circumferential surface) and different from the side surfaces of the convex portions, for producing desired convex portions with ease. The surfaces (including the side surfaces) of the convex portions designed for shaping optical fiber fitting portions serve to shape the optical fiber fitting portions, while the additional side surfaces play no role in shaping the optical fiber fitting portions.

When the convex portions designed for shaping optical fiber fitting portions are made in a shaping mold and are equalized in form and size of perpendicular cross-section in the width direction thereof, and when these convex portions are formed at a predetermined pitch, then, there can be produced, by a mold shaping method, an optical fiber guide block having optical fiber fitting portions in which all of optical fibers can be highly accurately positioned and fixed. When a shaping mold is produced with a general cutting or grinding machine, (1) it is relatively easy to form (n+1) of grooves which are necessary for shaping n of convex portions (n is a number) such that the depths of the grooves are substantially the same, and (2) it is relatively easy to form the grooves such that the grooves, which finally constitute convex portions for shaping optical fiber fitting portions, have a pitch accuracy of approximately ±0.5 $\mu$m or higher pitch accuracy.

For example, after the above (n+1) grooves are formed, the step of forming the circumferential regions is carried out. The step includes the processing of the right side surface of the rightmost groove and the left side surface of the leftmost groove, i.e., the formation of side surfaces of the elevated region, and the formation of boundaries one of which is present between one of the side surfaces of the elevated region and one circumferential region and the other is present between the other of the side surfaces of the elevated region and the other circumferential region, at a level or levels lower than the level of bottoms of grooves formed between one convex portion and another convex portion, whereby there can be produced a shaping mold having convex portions for shaping optical fiber fitting portions, which convex portions are equalized in form and size of perpendicular cross-section in the width direction thereof, as will be detailed in the explanation of the process for the production of a shaping mold, provided by the present invention.

The shaping mold of the present invention is therefore suitable for producing an optical fiber guide block having optical fiber fitting portions in which a plurality of optical fibers can be highly accurately positioned and fixed. When the additional side surfaces which form boundaries with the circumferential regions are formed with one double tapered grinder, generally, a secondary convex portion is formed along each additional side surface. In this manner, the shaping mold can be easily formed with one double tapered grinder, as will be explained later.

As described above, the shaping mold of the present invention can give an optical fiber guide block having optical fiber fitting portions in which all of a plurality of optical fibers can be highly accurately positioned and fixed. Therefore, not only an optical fiber array comprising the above optical fiber guide block can be easily optically connected to another optical fiber array or an optical part (e.g., optical waveguide), but also optical connection in passive alignment is possible.

The process for the production of a shaping mold will be explained hereinafter.

The process for the production of a shaping mold, provided by the present invention (to be sometimes referred to as "process of the present invention" hereinafter), is suitable for producing the above shaping mold of the present invention, and comprises the steps of forming a predetermined number of convex portions designed for shaping optical fiber fitting portions in a mold material, and forming circumferential regions in the mold material, the circumferential regions being adjacent to a region which is to constitute an elevated region when the convex portions are formed.

The material for the above mold material can be properly selected depending upon the material of an optical fiber guide block to be produced with the shaping mold of the present invention. For example, when the optical fiber guide block is formed of glass, the above material can be selected from cemented carbide, metal ceramic, vitreous carbon or ceramic. The above mold material may have the form of a flat plate, a block, or the like.

The process of the present invention includes a process in which the above step of forming the convex portions is carried out before the step of forming the circumferential regions and a process in which the step of forming the circumferential regions may be carried out before the step of forming the convex portions. The process of the present invention will be explained with reference to the process in which the above step of forming the convex portions is carried out before the step of forming the circumferential regions.

The optical fiber fitting portions of an optical fiber guide block are formed so as to extend from one side of a specific surface of the optical fiber guide block to the opposite side of the specific surface or so as to extend from one side of the above surface to predetermined positions on the surface. When the optical fiber guide block has a plurality of optical fiber fitting portions, it is required to substantially equalize the optical fiber fitting portions in form and size of perpendicular cross-section in the width direction thereof in many cases.

In the step of forming the optical fiber fitting portions in the process of the present invention, therefore, the convex portions for shaping optical fiber fitting portions are formed, in many cases, such that ends of the convex portions are positioned on one side of a predetermined transfer-shaping surface of the shaping mold and that the convex portions are substantially equalized in form and size of perpendicular cross-section in the width direction thereof as already explained in the explanation of the shaping mold of the present invention.

FIG. 1 schematically shows one example of the step of forming convex portions in the process for the production of a shaping mold, provided by the present invention. In the step of forming convex portions, as shown in FIG. 1, (n+1) of grooves 3a, 3b, 3c, 3d and 3e are formed in one surface 1a of a mold material at a predetermined pitch with one double tapered grinder 2 (n is the number of convex portions to be formed, and n=4 in FIG. 1). In this case, the grooves 3a, 3b, 3c, 3d and 3e are formed so as to have substantially the same depths. The grooves 3a, 3b, 3c, 3d and 3e extend from one side of the surface 1a, for example, to the opposite side on the surface 1a.

When the grooves 3a, 3b, 3c, 3d and 3e have substantially the same depths, the grooves 3a, 3b, 3c, 3d and 3e are formed by processing the mold material with substantially the same grinding area of the double tapered grinder 2. Therefore, the grooves 3a, 3b, 3c, 3d and 3e formed by the above processing have substantially the same depths and substantially the same groove-to-groove pitches between one groove and another adjacent groove of the grooves 3a, 3b, 3c, 3d and 3e, whereby there can be obtained convex portions 4a, 4b, 4c and 4d which are equalized in form and size of perpendicular cross section in the width direction thereof.

In the present specification, "side surfaces are different", or the like typically means that one side surface is formed with a grinder but the other side surface at least includes a surface formed with a different grinding area of the grinder or with other grinder. Otherwise, it means that a surface is shaped with the above "one shaping surface" but the other surface is shaped with the above "other surface".

Figure 2:
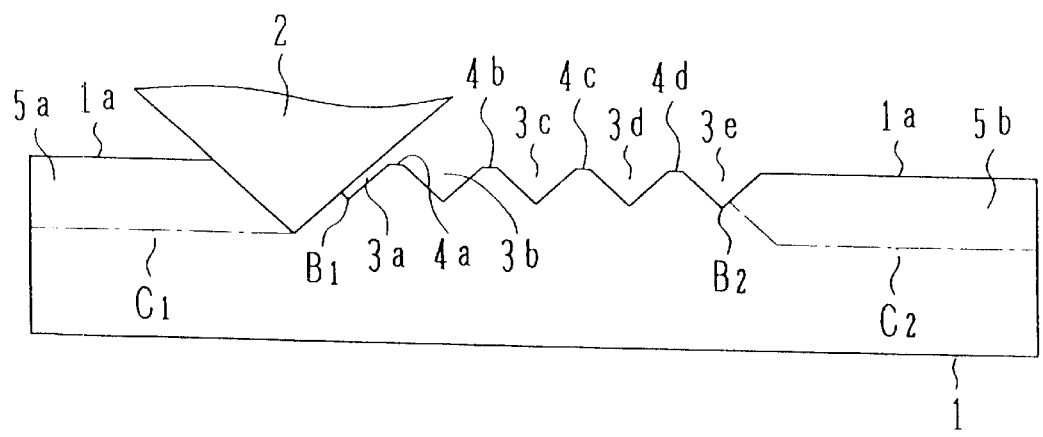
FIG. 2 is a schematic front view of a mold material, etc., for showing an example of the step of forming a circumferential region in the process for the production of a shaping mold in the present invention.

FIG. 2 schematically shows the step of forming the circumferential regions in the process for the production of a shaping mold, provided by the present invention. In this step, the circumferential regions are formed such the circumferential regions have boundaries, one of which is present between one of side surfaces of an elevated region (a region which is elevated and has the convex portions in FIG. 2) and one circumferential region and the other is present between the other of the side surfaces of the elevated region and the other circumferential region, at a level or levels lower than the level of bottoms of grooves formed between one convex portion and another convex portion. In this case, the above side surfaces of the elevated portion are additional side surfaces different from side surfaces of any convex portions designed for shaping optical fiber fitting portions.

Specifically, as shown in FIG. 2 (which is a schematic front view of the mold material, etc.), a portion 5a present on the left side of a bottom $B_1$ of the groove 3a and a portion 5b present on the right side of a bottom $B_2$ of the groove 3e are removed with the same double tapered grinder 2 as that used in the step of forming the convex portions or with other grinder (e.g., flat grinder) such that the grinder does not touch the concave portions 4a and 4d. Further, when the above portions 5a and 5b are removed, the grinder is allowed to grind into the mold material 2 deeper than the bottoms of the grooves between the concave portions, so that the boundaries between the elevated portion and the circumferential regions are formed at a level or levels lower than the level of the grooves. In FIG. 2, a chain line $C_1$ shows the position of an upper surface (flat surface in FIG. 2) of the circumferential region being formed, and a chain line $C_2$ shows the position of an upper surface (flat surface in FIG. 2) of the other circumferential region to be formed later and the side surface (to be formed later) of the elevated portion.

The upper surface of each circumferential region may be a flat surface (horizontal surface or tilted surface), a curved surface or an uneven (concavo-convex) surface, while the boundaries of the upper surfaces (of the circumferential region) and the elevated portion are positioned at a level or levels lower than the level of the bottoms of the grooves between the convex portions designed for shaping optical fiber fitting portions, as already described. The above upper surfaces work to transfer-shape the sided upper surfaces of an optical fiber guide block. Naturally, there may be employed an embodiment in which the elevated region has a certain region which can also work to transfer-shape a certain region of the above upper side surface.

Figure 3:
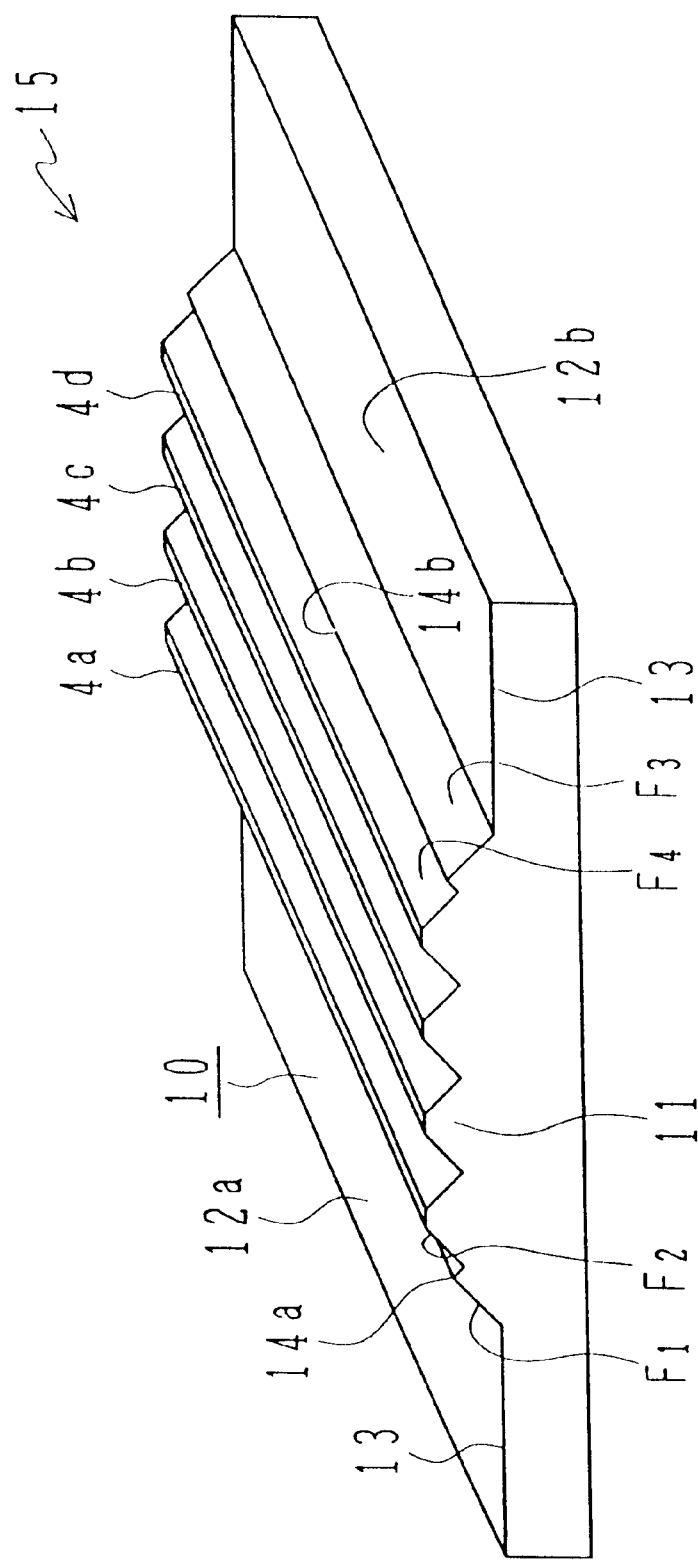
FIG. 3 is a schematic perspective view of a shaping mold of the present invention.

FIG. 3 shows a schematic perspective view of a shaping mold 15 obtained by carrying out the step of forming convex portions in FIG. 1 and the step of forming circumferential regions in FIG. 2. In FIG. 3, the shaping mold 15 has an upper surface and the side surfaces of an elevated region 11 and the upper surfaces of the circumferential regions 12a and 12b as shaping surfaces 10 for shaping optical fiber fitting portions and sided upper surfaces of an optical fiber guide block. And, four convex portions 4a to 4d designed for shaping 4 optical fiber fitting portions are formed on the upper surface side of the elevated region 11, and circumferential regions 12a and 12b are formed adjacent to the elevated region 11 such that their upper surfaces are positioned at a level lower than the level of the grooves 3b to 3d (see FIG. 1 or 2) formed between one convex portion and another convex portion of the convex portions 4a to 4d. Further, a side surface $F_1$ of the elevated region 11 constitutes one side surface (additional side surface) of the elevated region 11 and differs from the side surfaces (e.g., $F_2$) of the convex portions, and a side surface $F_3$ constitutes to the other side surface (additional side surface) of the elevated region 11 and differs from the side surfaces (e.g., $F_4$) of the convex portions.

In the shaping mold 15 shown in FIG. 3, the elevated region 11 and the convex portions 4a to 4d extend from one side 13 of the shaping surfaces 10, the convex portions 4a to 4d are equalized in form and size of perpendicular cross section in the width direction thereof, and the convex portions 4a to 4d are formed substantially at constant pitches.

When one double tapered grinder is used for producing the shaping mold of the present invention, a secondary convex portion is formed along each of the outermost side surfaces of the convex portions closest to the side surfaces of the elevated region. For example, the shaping mold 15 shown in FIG. 3 has a secondary convex portion 14a formed along the convex portion 4a and a secondary convex portion 14b formed along the convex portion 4d. When a plurality of types of grinders are used for producing the shaping mold of the present invention, there can be two embodiments, one in which similar secondary convex portion or portions are formed and the other in which no convex portions are formed.

When a plurality of types of grinders are used for producing a shaping mold according to the process of the present invention, there can be obtained a shaping mold which somewhat differs from the shaping mold 15 shown in 3 but similarly suitable for producing an optical fiber guide block which permits highly accurate positioning and fixing of a predetermined number of optical fibers in optical fiber fitting portions.

Figure 5:
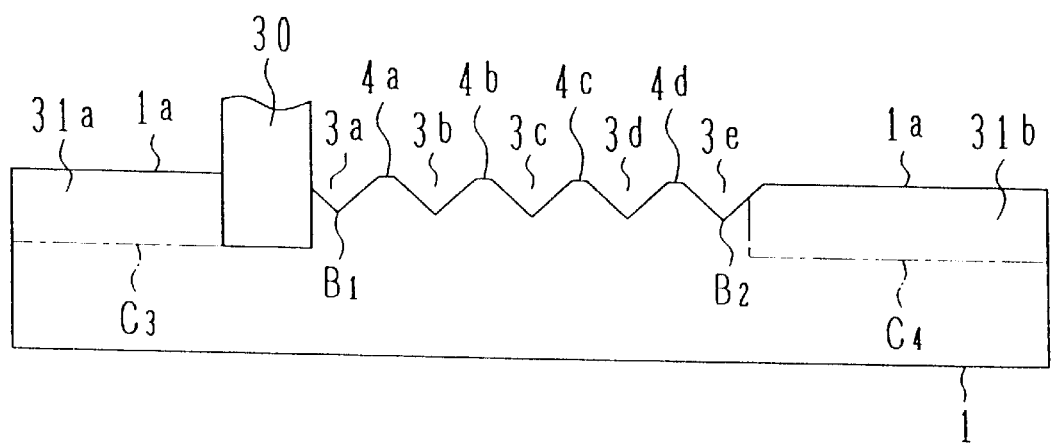
FIG. 5 is a schematic front view of a mold material, etc., for showing a variant of the step of forming a circumferential region in the process for the production of a shaping mold in the present invention.
Figure 6:
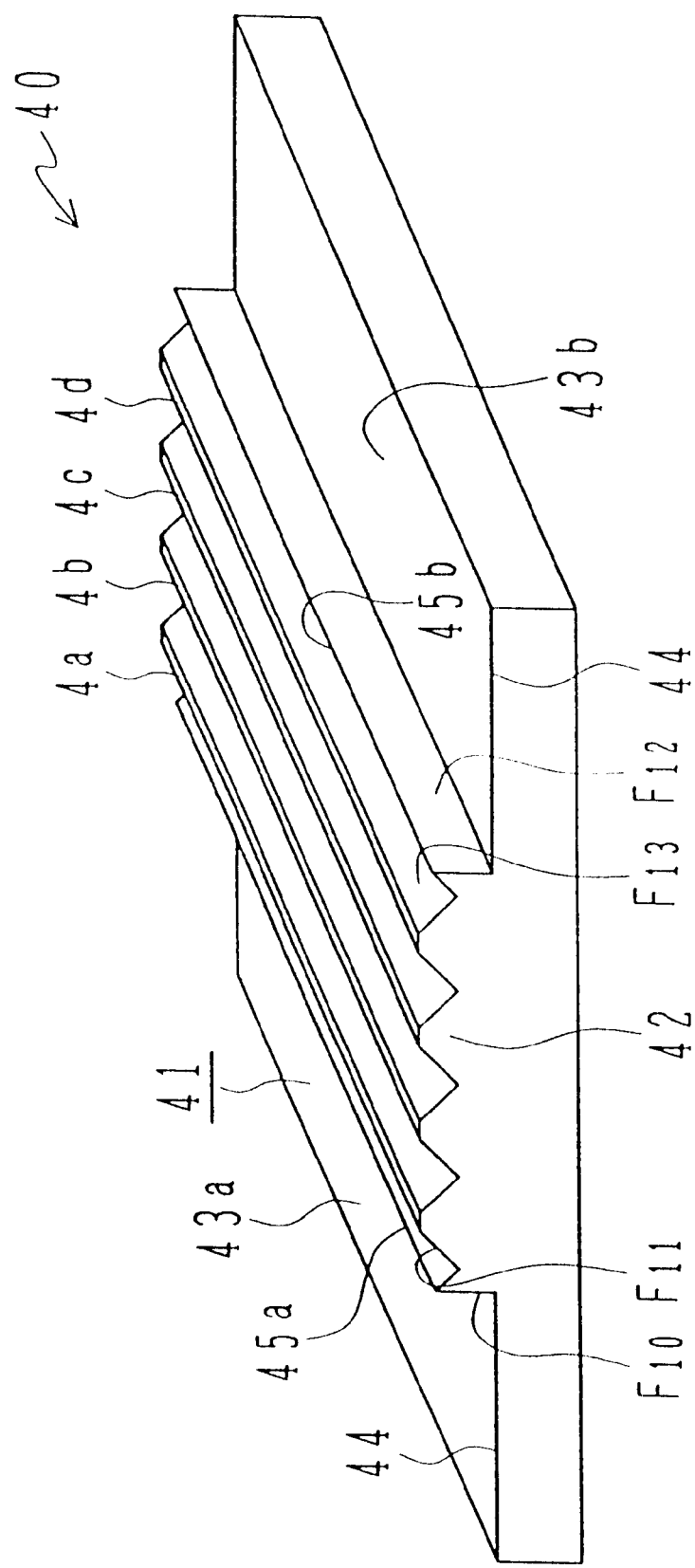
FIG. 6 is a schematic perspective view of a variant of the shaping mold of the present invention.

FIG. 5 is a schematic front view of a mold material, etc., for showing a variant of the step of forming circumferential regions. FIG. 6 is a schematic perspective view of a variant of the shaping mold of the present invention. For example, after the step of forming convex portions with a double tapered grinder shown in FIG. 1 is carried out, the step of forming circumferential regions with a flat grinder is carried out as shown in FIG. 5, whereby a shaping mold 40 shown in FIG. 6 can be obtained.

The shaping mold 40 shown in FIG. 6 has an upper surface and the side surfaces of an elevated region 42 and the upper surfaces (horizontal surfaces) of circumferential regions 43a and 43b as shaping surfaces 41 for shaping optical fiber fitting portions and sided upper surfaces of an optical fiber guide block. And, four convex portions 4a to 4d designed for shaping 4 optical fiber fitting portions are formed on the upper surface side of the elevated region 42, and the circumferential regions 43a and 43b are formed adjacent to the elevated region 42 such that their upper surfaces are positioned at a level lower than the level of grooves 3b to 3d (see FIG. 5) formed between one convex portion and another convex portion of the convex portions 4a to 4d. Further, a side surface $F_{10}$ of the elevated region 42 constitutes one side surface (additional side surface) of the elevated region 42 and differs from the side surfaces (e.g., $F_{11}$) of the convex portions, and a side surface $F_{12}$ constitutes the other side surface (additional side surface) of the elevated region 42 and differs from the side surfaces (e.g., $F_{13}$) of the convex portions. The above side surfaces $F_{10}$ and $F_{12}$ are substantially perpendicular to the upper surfaces of the circumferential regions.

In the shaping mold 40 shown in FIG. 6, the elevated region 42 and the convex portions 4a to 4d extend from one side 44 of the shaping surfaces 10, the convex portions 4a to 4d are equalized in form and size of perpendicular cross section in the width direction thereof, and the convex portions 4a to 4d are formed substantially at constant pitches. Like the shaping mold 15 shown in FIG. 3, the shaping mold 40 shown in FIG. 6 has a secondary convex portion 45a formed along the convex portion 4a and a secondary convex portion 45b formed along the convex portion 4d.

In FIG. 5, the same member, portions, regions, etc., as those in FIG. 2 are shown by the same reference numerals. In FIG. 5 which is a schematic front view of the mold material, etc., reference number 31 shows a portion present on the left side of a bottom $B_1$ of the groove 3a, reference numeral 31b shows a portion present on the right side of a bottom $B_2$ of the groove 3e, a chain line $C_3$ shows the position of an upper surface (flat surface in FIG. 5) of the circumferential region being formed, and a chain line $C_4$ shows the position of an upper surface (flat surface in FIG. 5) of the other circumferential region to be formed later and the side surface (to be formed later) of the elevated portion. In FIG. 6, the same member, portions, regions, etc., as those in FIG. 3 are shown by the same reference numerals.

Figure 8:
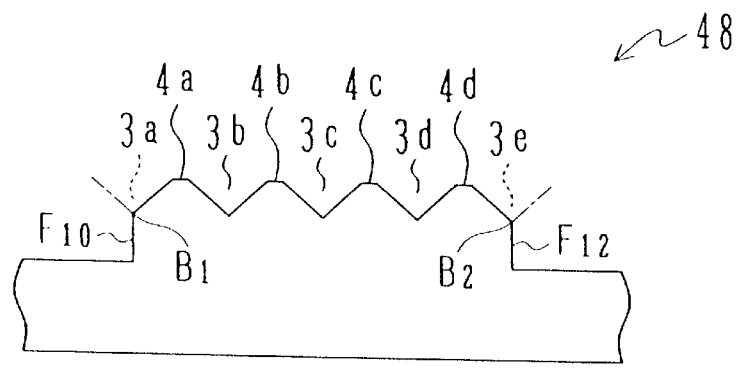
FIG. 8 is a schematic partial front view of a variant of the shaping mold of the present invention.

FIG. 8 is a schematic front view of another variant of the shaping mold of the present invention, in which the same member, portions, regions, etc., as those in FIG. 5 or 6 are shown by the same reference numerals.

When an attempt is made to produce the above shaping mold 40 (shown in FIG. 6) having substantially perpendicular side surfaces $F_{10}$ and $F_{12}$ of the elevated region 42 in which the side surfaces $F_{10}$ and $F_{12}$ extend directly from the bottoms $B_1$ and $B_2$ of the grooves 3a and 3e as shown in FIG. 8, there are caused a few problems as will be detailed later. When a shaping mold having substantially perpendicular side surfaces of an elevated region is produced, preferably, secondary convex portions are formed so as to continue to the side surfaces of the elevated region and along the outermost side surfaces of the convex portions closest to the side surfaces of the elevated region as shown in the shaping mold 40 in 6.

Further, when a shaping mold having substantially perpendicular side surfaces of an elevated portion is used, and when a shaped product (shapeable material) has a larger thermal expansion coefficient by a certain degree than the shaping mold, the following problem takes place regardless of the presence or absence of the secondary convex portions in the shaping mold.

That is, when a shaped product (shapeable material) has a larger thermal expansion coefficient by a certain degree than the shaping mold, the contraction ratio of the shaped product (optical fiber guide block) is larger by a certain degree than the contraction ratio of the shaping mold during a cooling step after the mold shaping. And, when the side surfaces of the elevated region of the shaping mold are substantially perpendicular, a compression stress from the shaped product to the shaping mold is exerted substantially perpendicularly on the above substantially perpendicular side surfaces. As a result, it is difficult to release the shaped product (optical fiber guide block) from the shaping mold even if the shaping surfaces of the shaping mold are coated with a release film. There is therefore caused a problem that the shaped product (optical fiber guide block) is liable to undergo cracking or breaking when it is taken out of the shaping mold.

The above mold releasability problem can be substantially overcome by forming side surfaces of the elevated region so as to have an ascent from the circumferential regions upwardly toward the side surfaces of the convex portions near the elevated portion, like the side surfaces $F_1$ and $F_3$ of the shaping mold 15 shown in FIG. 3. When the gradient angle of the above side surfaces of the elevated region is substantially the same as the gradient angle of the side surfaces of the convex portions designed for shaping optical fiber fitting portions, the shaping mold can be produced with one or two types of grinders.

The process of the present invention includes the above step of forming the convex portions and the above step of forming the circumferential regions. The shaping mold produced by the process of the present invention may have a release film on its shaping surfaces. When a shaping mold having a release film on its shaping surfaces is produced, the step of forming a release film is carried out after the steps of forming the convex portions and the step of forming the circumferential regions are carried out. In the step of forming a release film, a release film of a carbon-containing material, a platinum-alloy-containing material, a gold-alloy-containing material or the like is formed on those surfaces which constitute the shaping surfaces, by a vacuum deposition method, a sputtering method or a CVD method.

The optical fiber guide block of the present invention will be explained hereinafter.

The optical fiber guide block of the present invention comprises a region of a plurality of optical fiber fitting portions in the form of grooves in one surface and side regions adjacent to the region of the optical fiber fitting portions. The optical fiber guide block of the present invention includes an optical fiber guide block having one side region formed on the right or left side when a plurality of the optical fiber fitting portions are viewed as a front view. Preferably, the optical fiber guide block is practically preferably an optical fiber guide block having two side regions on both sides of the region of the optical fiber fitting portions and having the upper surfaces of the side regions substantially at the same level. Further, the boundaries between one optical fiber fitting portion and another of the optical fiber fitting portions have peaks or peak surfaces at a level lower than the level or levels of side region edges on the sides of the region of the optical fiber fitting portions.

The "a plurality of the optical fiber fitting portions are viewed as a front view" means that the optical fiber fitting portions are viewed from a position in front of an optical connection end surface of an optical fiber guide block. The "optical connection end surface of an optical fiber guide block" means an end surface which faces other optical fiber guide block or an optical part when the optical fibers are connected to optical fibers or the optical part.

The optical fiber guide block of the present invention has its main feature in that one side region has an additional side surface which is different from any optical-fiber-supporting side surfaces of the optical fiber fitting portions and which is on the side of the region of the optical fiber fitting portion. The optical fiber guide block of the present invention is particularly preferably an optical fiber guide block having left and right side regions having additional side surfaces which are different from any optical-fiber-supporting side surfaces of the optical fiber fitting portions and which are on the side of the region of the optical fiber fitting portion when a plurality of the optical fiber fitting portions are viewed as a front view.

The optical fiber guide block having the above structure, provided by the present invention, can be easily obtained by a mold-shaping method using the already described shaping mold of the present invention.

Figure 10:
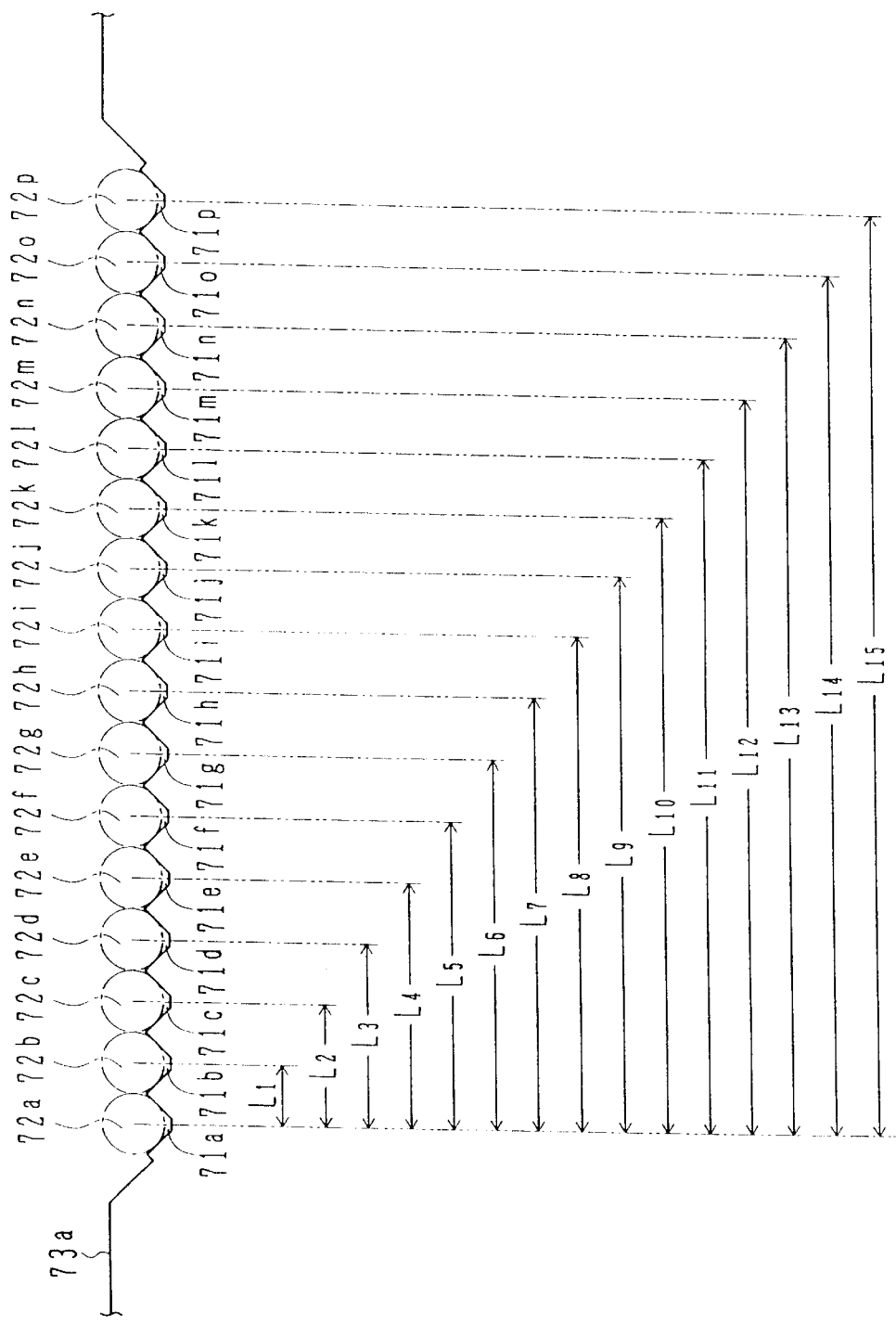
FIG. 10 is a schematic partial cross-sectional view (reversed) of a shaping mold obtained in Example 1, for showing positions for measuring convex portions for accumulated pitches.
Figure 11:
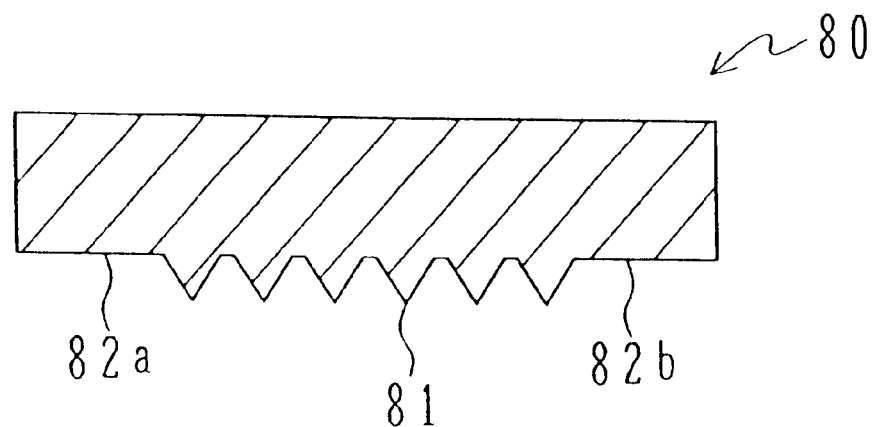
FIG. 11(a) is a schematic cross-sectional view of an example of a conventional shaping mold.
FIG. 11(b) is a schematic cross-sectional view of an optical fiber guide block produced with the shaping mold shown in FIG. 11(a).
Figure 11:
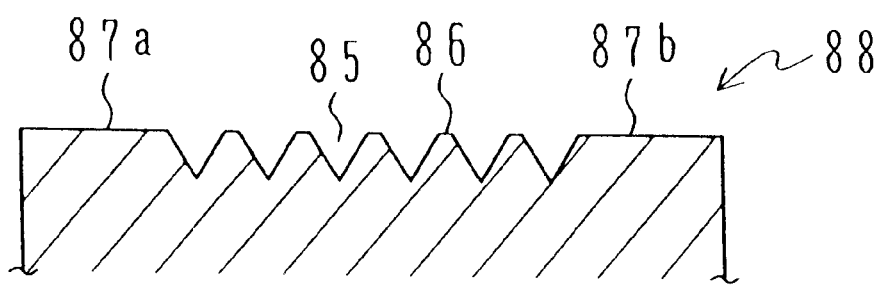
Figure 12:
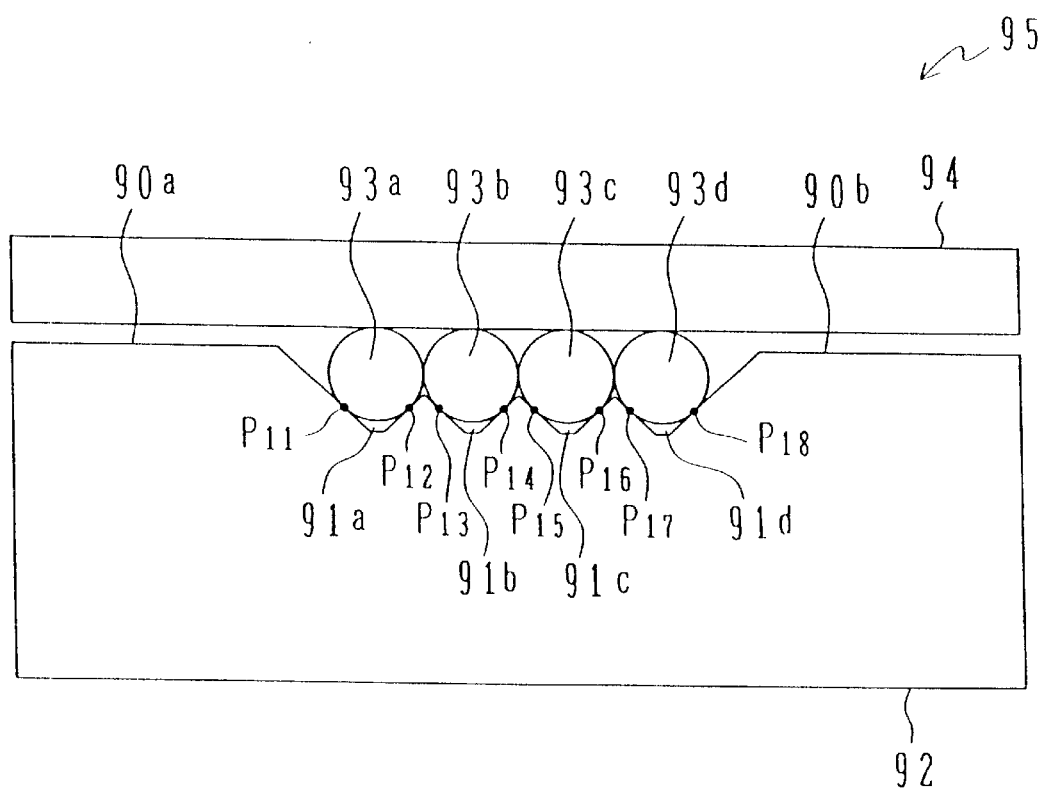
FIG. 12 is a schematic front view of an example of an optical fiber array.

For highly accurately positioning and fixing all of a plurality of optical fibers in the optical fiber guide block of the present invention, preferably, the accumulated pitch accuracy between one outermost optical fiber fitting portion and other optical fiber fitting portion is equivalent to, or higher than, the accumulated pitch accuracy between any two optical fiber fitting portions other than the above "one outermost optical fiber fitting portion". The term "accumulated pitch accuracy" refers to a difference between a designed value of a pitch (distance) from the center of one optical fiber fitting portion to the center of another optical fiber fitting portion and a found value of the same when the optical fiber fitting portions are viewed as a front view (e.g., as shown in FIG. 10). Further, the height accuracy when an optical fiber is positioned and fixed in the outermost optical fiber fitting portion is equivalent to the height accuracy when the same optical fiber fitting portion is positioned and fixed in any other optical fiber fitting portion. The term "height accuracy" refers to a difference between a designed value of height or depth of an optical fiber from the level of a reference surface (e.g., sided upper surface) when the optical fiber is positioned and fixed in an optical fiber fitting portion and a found value of the same (provided that the size (diameter) of the optical fiber during designing and the size of the actually measured optical fiber are the same).

Specifically, in the optical fiber guide block of the present invention, the accumulated pitch accuracy between one outermost optical fiber fitting portion and other optical fiber fitting portion is equivalent to the accumulated pitch accuracy between any two optical fiber fitting portions other than the above "one outermost optical fiber fitting portion". Preferably, the accumulated pitch accuracy between one outermost optical fiber fitting portion as a reference and other optical fiber fitting portion is approximately within ±0.5 $\mu$m. Further, the height accuracy when an optical fiber is positioned and fixed in any optical fiber fitting-portion is preferably within approximately ±0.5 $\mu$m.

An optical fiber guide block having optical fiber fitting portions which are equalized in form and size of perpendicular cross section in the width direction thereof and which are formed substantially at a constant pitch as described above can be easily produced by a mold shaping method using the already described shaping mold of the present invention.

Figure 4:
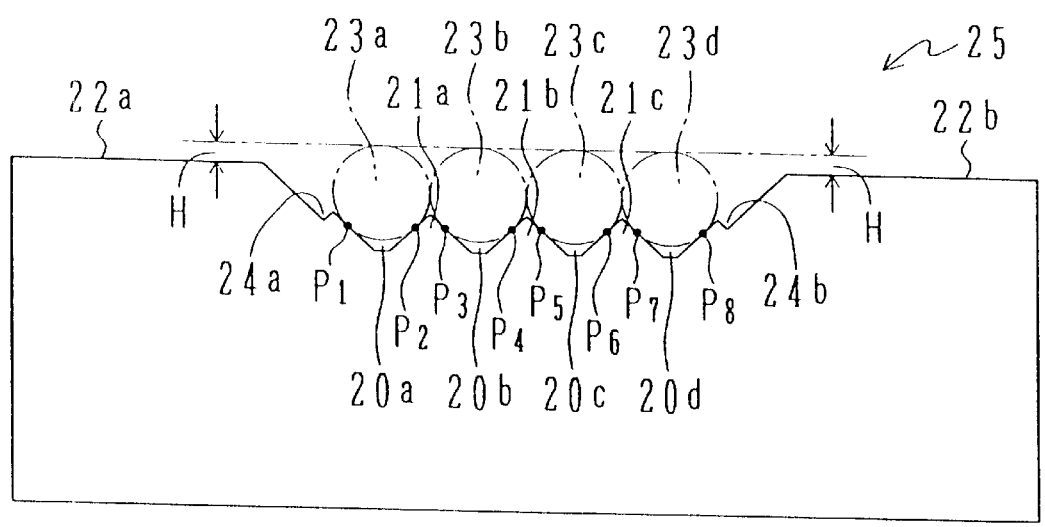
FIG. 4 is a schematic front view of an optical fiber guide block produced with the shaping mold shown in FIG. 3.

For example, when the shaping mold 15 shown in FIG. 3 is used, as shown in FIG. 4, there can be obtained an optical fiber guide block 25 having four optical fiber fitting portions 20a, 20b, 20c and 20d in the form of grooves, which are equalized in form and size of perpendicular cross section in the width direction thereof and formed substantially at a constant pitch, and which have boundaries 21a, 21b and 21c having peaks or peak surfaces at a level lower than sided upper surfaces 22a and 22b (horizontal surfaces in FIG. 4) on the right and left sides. The optical fiber guide block 25 is included in the optical fiber guide block of the present invention.

In FIG. 4, reference numeral 24a shows a concave portion (to be referred to as "secondary concave portion" hereinafter) shaped with the secondary convex portion 14b of the shaping mold 15, and reference numeral 24b shows a secondary concave portion shaped with secondary convex portion 14a of the shaping mold 15.

When optical fibers 23a, 23b, 23c and 23d having the same outer diameters are fitted in the optical fiber fitting portions 20a to 20d of the above optical fiber guide block (see FIG. 4), of supporting positions $P_1$ and $P_2$ of the optical fiber fitting portion 20a for the optical fiber 23a, supporting positions $P_3$ and $P_4$ of the optical fiber fitting portion 20b for the optical fiber 23b, supporting positions $P_5$ and $P_6$ of the optical fiber fitting portion 20c for the optical fiber 23c and supporting positions $P_7$ and $P_8$ of the optical fiber fitting portion 20d for the optical fiber 23d, the supporting positions $P_1$, $P_3$, $P_5$ and $P_7$ are substantially at the same level, and the supporting positions $P_2$, $P_4$, $P_6$ and $P_8$ are also substantially at the same level.

When the above optical fibers 23a to 23d are pressed and fixed to the optical fiber guide block 25 with a pressing member and an adhesive, the height amounts H (see FIG. 4) of the optical fibers 23a to 23d from the level of the sided upper surface 22a or 22b on the right or left side are substantially the same. In other words, the optical fibers 23a to 23d have their optical axes positioned at one level. Further, after the optical fibers 23a to 23d are pressed and fixed to the optical fiber guide block 25 with a pressing member and an adhesive, the optical fibers have a constant pitch between one optical fiber and the other optical fiber which are adjacent to each other.

When the optical fiber guide block 25 is used, therefore, all of the optical fibers 23a to 23d can be highly accurately positioned and fixed.

The optical fiber guide block 25 shown in FIG. 4 is included in the optical fiber guide block of the present invention, and the optical fiber guide block of the present invention shall not be limited thereto.

For example, when a perpendicular cross section of the optical fiber guide block of the present invention in the width direction thereof is taken, each optical fiber fitting portion has the form of a V-letter-shaped-groove, a groove formed by flattening the bottom of a V groove, a U-letter-shaped groove, a groove formed by flattening the bottom of a U groove, or an arch.

The number and the layout of the optical fiber fitting portions, the pitch between adjacent optical fiber fitting portions and the form and the size of the perpendicular cross section of the optical fiber fitting portions in the width direction thereof are properly determined depending upon use, etc., of an optical fiber guide block as an end product. Generally, the optical fiber fitting portions are formed in parallel with each other or one another at a predetermined pitch.

As already described, the optical fiber fitting portions are formed so as to achieve the following. When optical fibers are positioned and fixed in the optical fiber fitting portions, the circumferential surfaces of the optical fibers have a height or depth within a predetermined value (in the range of approximately +D/2 to −D/10, D=diameter of each optical fiber) from the level of a predetermined reference surface (e.g., side upper surface on the right or left of the optical fiber fitting portions). The amount of projection (height of projected portion of optical fiber) or the amount of depression (depth, distance to top surface of optical fiber) of the circumferential surfaces of the optical fibers can be properly determined depending upon use of an optical fiber guide block as an end product and optical fibers to be used.

The sided upper surfaces on the right and left side may be flat (horizontal or tilted), curved or uneven (concavo-convex). The peaks or peak surfaces between one optical fiber fitting portion and another of the optical fiber fitting portions is at a level lower than the level of that edge of the sided upper surface on the right or left side which faces the optical fiber fitting portions, while the above peaks or peak surfaces are practically preferably at a level lower than the level or levels of the above edges of the sided upper surfaces on the right and left sides.

Further, the sided upper surfaces on the right and left sides are formed preferably at the same level. When the above peaks or peak surfaces are at a level at which the sided upper surfaces are present, the peaks or peak surfaces are liable to be damaged when optical fibers positioned in the optical fiber fitting portions are fixed with a pressing member or when the optical fiber guide block is placed with the optical fiber fitting portions downward.

Figure 7:
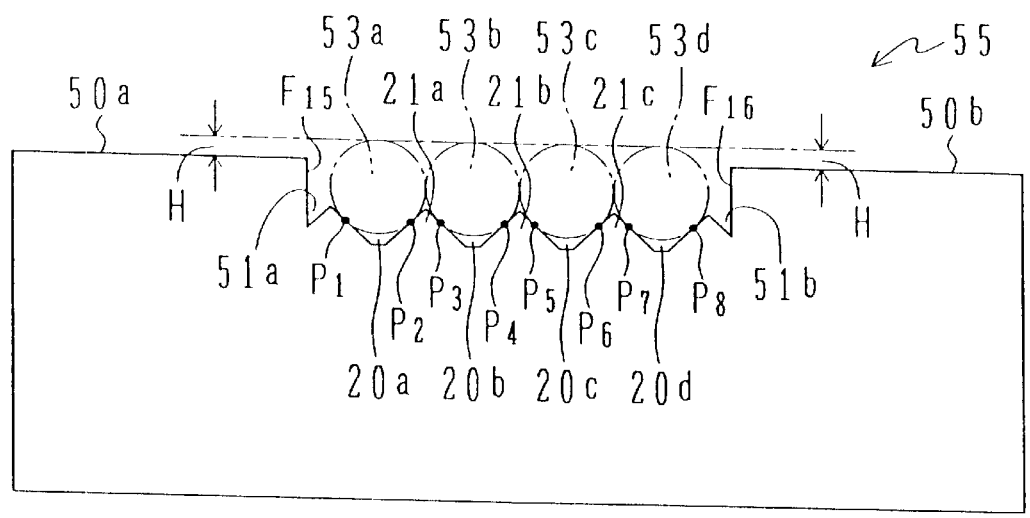
FIG. 7 is a schematic front view of an optical fiber guide block produced with the shaping mold shown in FIG. 6.

FIG. 7 shows a schematic front view of an optical fiber guide block 55 produced by a mold shaping method using the shaping mold 40 shown in FIG. 6. The optical fiber guide block 55 has side surfaces (F15 and F16) which face the optical fiber fitting portions, i.e., which are on the sides of the region of the optical fiber fitting portions. These side surfaces are substantially perpendicular, while they may be tilted as shown in FIG. 4. In FIG. 7, reference numerals 50a and 50b show sided upper surfaces (flat surfaces or horizontal surfaces), reference numerals 51a and 51b show secondary concave portions, and reference numerals 53a to 53d show optical fibers. The same member, portions, regions, etc., as those in FIG. 5 are shown by the same reference numerals.

Figure 9:
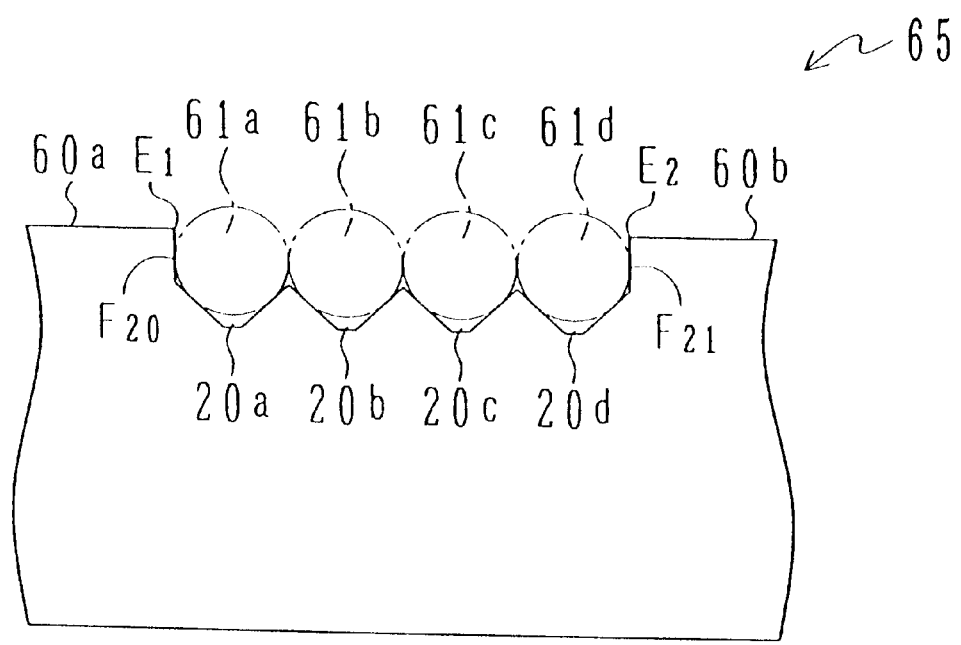
FIG. 9 is a schematic partial front view of an optical fiber guide block produced with the shaping mold shown in FIG. 8.

When the above side surfaces (F15 and F16) of the side regions are formed as substantially perpendicular surfaces, it can be determined as required whether or not the secondary concave portions are formed. For example, FIG. 9 shows an optical fiber guide block produced by a mold shaping method using the shaping mold shown in FIG. 8. As shown in FIG. 9, no concave portions may be formed anywhere outside optical fiber fitting portions 20a and 20d. In this case, the optical fiber guide block 65 has side surfaces F20 and F21, which are on the sides of the region of the optical fiber fitting portions. The side surface F20 continues to left-side side surface of an optical fiber fitting portion 20a, and the side surface F21 continues to the right-side side surface of an optical fiber fitting portion 20d. In FIG. 9, reference numerals 60a and 60b show sided upper surfaces (flat or horizontal) on the left and right sides, and reference numerals 61a to 61d show optical fibers. The same member, portions, regions, etc., as those in FIG. 5 are shown by the same reference numerals.

As described above, those side surfaces of the side regions which are on the sides of the region of the optical fiber fitting portions may be formed as substantially perpendicular surfaces. However, when one of the above side surfaces of the side regions is a substantially perpendicular surface which continues to the side surface of the optical fiber fitting portion or when both of the above side surface of the side regions are perpendicular surfaces which continue to the side surfaces of the optical fiber fitting portions (the above perpendicular surface will be sometimes referred to as "substantially perpendicular surface A" hereinafter), the following problems (i) and (ii) are caused in some cases.

(i) If the side surface F20 of the side region on the left in FIG. 9 is formed as a substantially perpendicular surface A, the optical fiber 61a easily comes into contact with an edge E1 and the side surface F20 when the optical fiber 61A is fitted in the optical fiber fitting portion 20a, so that it is difficult to fit the optical fiber 61a in the optical fiber fitting portion 20a, or the optical fiber 61a is liable to be damaged. Similarly, this is also true if the side surface F21 is formed as a substantially perpendicular surface A.

(ii) If the side surface F20 of the side region on the left in FIG. 9 is formed as a substantially perpendicular surface A, the side surface F20 and the right-side side surface of the optical fiber fitting portion 20 (an inclined surface extending from the bottom to the optical fiber fitting portion 20a to an outward direction on the right) differ in degree of a contraction which takes place in a shaped article (optical fiber guide block) during a cooling step after the optical fiber guide block 65 is shaped. This is also true if the side surface F21 is formed as a substantially perpendicular surface A. As a result, the form and the size of the optical fiber fitting portion 20a or 20d may deviated from predetermined form and size in some cases. When such a deviation is caused, it is difficult to highly accurately position and fixe all of the optical fibers 61a to 61d.

For avoiding the above problems, preferably, the optical fiber guide block preferably has secondary concave portions, one of which is present between the side surface of one side region and the optical fiber fitting portion which faces the above side surface and the other of which is similarly present on the other side, as shown in FIG. 7.

Further, when an optical fiber guide block has substantially perpendicular side surfaces of side regions, and when a shaped product (shapeable material) has a larger thermal expansion coefficient than the shaping mold by a certain degree, the above problems occur regardless of whether or not the optical fiber guide block has secondary concave portions.

The process for the production of the optical fiber guide block, provided by the present invention, will be explained hereinafter.

The process for the production of an optical fiber guide block, provided by the present invention (to be sometimes referred to as "the process of the present invention" hereinafter), comprises shaping a shapeable material into an optical fiber guide block by a mold shaping method using the shaping mold of the present invention, the optical fiber guide block comprising a region of a plurality of optical fiber fitting portions formed in one surface in the form of grooves and side regions adjacent to the region of the optical fiber fitting portions, the optical fiber guide block being formed by a mold-shaping method, the optical fiber fitting portions having boundaries between one optical fiber fitting portion and another optical fiber fitting portion, the boundaries having peaks or peak surfaces at a level lower than the level or levels of side region edges on the sides of the region of the optical fiber fitting portions, the side regions having additional side surfaces which are different from any optical-fiber-supporting side surfaces of the optical fiber fitting portions and which are on the side of the region of the optical fiber fitting portions.

For producing a shaped product by a mold shaping method, a shaping mold is required which generally comprises an upper mold member and a lower mold member or comprises an upper mold member, a lower mold member and a sleeve mold member. The shaping mold of the present invention is therefore used as an upper mold member or a lower mold member.

Further, the above mold shaping can be carried out by a method employed for producing conventional optical fiber guide blocks.

The shapeable material (preform) used in the process of the present invention can be properly selected from glass, crystallized glass, ceramic, silicone, a resin or a composite material composed of a resin and an inorganic filler depending upon use of the optical fiber guide block as an end product, while glass is most preferably used.

The optical fiber array of the present invention will be explained.

The optical fiber array of the present invention comprises the above optical fiber guide block, a predetermined number of optical fibers fitted in optical fiber fitting portions of the optical fiber guide block and a pressing member used for pressing and fixing the optical fibers to the optical fiber fitting portions, at least the optical fiber guide block and the pressing member being bonded and fixed to each other.

The above optical fiber array can be produced by a method employed for producing a conventional optical fiber array. Naturally, however, the optical fiber guide block of the present invention is used.

The optical fiber array of the present invention uses the optical fiber guide block of the present invention and therefore permits the highly accurate positioning and fixing of all of a plurality of optical fibers. Since a predetermined number of optical fibers are positioned and fixed highly accurately in the optical fiber array, the optical fibers of the optical fiber array and optical fibers of other optical fiber array having the same accuracy can be more easily optically connected not only in active alignment but also in passive alignment, or the optical fibers of the optical fiber array and an optical part (e.g., optical waveguide) can be more easily optically connected not only in active alignment but also in passive alignment.

As explained above, there can be easily produced the optical fiber guide block having optical fiber fitting portions in which a plurality of optical fibers can be highly accurately positioned and fixed, and there can be easily produced the shaping mold which enables the production of the above optical fiber guide block.

Further, the optical fiber guide block of the present invention can easily give the optical fiber array comprising a plurality of optical fibers which are highly accurately positioned and fixed.

The present invention will be explained more in detail with reference to Examples hereinafter, while the present invention shall not be limited by these Examples.

EXAMPLE 1

(A) Preparation of Shaping Mold (1) Step of Forming Convex Portions

Seventeen (17) V grooves were formed in one surface of a plate-shaped mold material at a pitch of 127 $\mu$m (designed value) with a double tapered grinder of which the main grinding surfaces have a 90°-angled edge. The V grooves had a depth of 54 $\mu$m (designed value in an optical fiber guide block as an end product).

The above V grooves extended from the center and its vicinities of one side of the above surface of the mold material to the center and its vicinities of the opposite side of the surface and were in parallel with one another.

As a result, 16 convex portions designed for shaping optical fiber fitting portions were formed of boundaries each of which was present between one groove and another adjacent groove.

The above step of forming the convex portions can be carried out in the same manner as in the step shown in FIG. 1 except that the number of the grooves was changed to 17 and the form and size of the grooves in the width direction thereof were adjusted as required in this Example.

(2) Step of Forming Circumferential Regions

A region which was present on the left side of the bottom of the groove which was positioned on the leftmost side when the above convex portions were viewed from a position in front of end surfaces thereof toward their length direction (the above region will be referred to as "region A" hereinafter) was removed with the above grinder (grinder used in the step of forming the convex portions) to a depth of 121 $\mu$m (designed value) from the level of the upper surface of the region A. Similarly, a region which was present on the right side of the bottom of the groove which was positioned on the rightmost side when the above convex portions were viewed from a position in front of end surfaces thereof toward their length direction (the above region will be referred to as "region B" hereinafter) was removed with the same grinder to a depth of 121 $\mu$m (designed value) from the level of the upper surface of the region B.

As a result, there was obtained a shaping mold having an elevated region, 16 concave portions formed in the upper surface of the elevated region, a circumferential region ("circumferential region a" hereinafter) remaining after the above removal of the region A and a circumferential region B ("circumferential region b" hereinafter) remaining after the above removal of the region B.

When the region A was removed, the distance from the peak of a secondary convex portion (to be formed) to the above "bottom of the groove which was positioned on the leftmost side" when the mold material was viewed as a plan view was set at 15 $\mu$m. The above distance will be referred to as "shift amount". When the region B was removed, similarly, the shift amount was set at 15 $\mu$m.

Ten shaping molds were prepared by repeating the above steps (1) and (2) in the same manner except that the number of convex portions, etc., was changed. The shaping molds had forms analogous to the form of the shaping mold 15 shown in FIG. 15.

(B) Measurement of Shaping Mold for Accuracy

Each of the above shaping mold was measured for accuracy as follows.

A tracer-type contour measuring apparatus having a tracer having a top end radius of 25 μm (Contour Record 2600C, supplied by Tokyo Seimitsusha) was used. A shaping mold was scanned with the tracer of the above apparatus from the beginning of surface of the circumferential region a to the end of surface of the circumferential region B in the direction at right angles with the length direction of the convex portions, to determine contour coordinates of the surface of the circumferential region a, the surface of the elevated portion (including the convex portions designed for shaping optical fiber fitting portions) and the surface of the circumferential region b. On the basis of the contour coordinates, a contour form of scanned portions was shown on a screen of a display while an obtained image was reversed (upside down). The contour form shown in the above manner corresponds to the contour form of an optical fiber guide block, i.e., the contour form of the surface of the optical fiber fitting portions, the surface of boundaries between one optical fiber fitting portion and another adjacent optical fiber fitting portion and the sided upper surfaces.

FIG. 10 is a schematic partial cross-sectional view (reversed) of a shaping mold obtained in Example 1, for showing positions for measuring convex portions for accumulated pitches. As shown in FIG. 10, circles 72a to 72 corresponding to quartz-based single-mode optical fibers having a diameter of 125 μm and were one by one inserted in imaginary optical fiber fitting portions 71a to 71p, to determine coordinates of centers of the circles 72a to 72p when each of the circles 72a and 72p was in contact with two inclined surfaces (inner side walls) of the corresponding imaginary optical fiber fitting portions 71a to 71p.

The above coordinates of the centers were used to determine an accuracy of distances $L_1$ to $L_{15}$ from the center of the circle 72a in the imaginary optical fiber fitting portion 71a positioned on the leftmost side on the screen to the centers of the remaining 15 circles (these distances will be referred to as "accumulated pitch" of convex portion designed for shaping optical fiber fitting portion) and an accuracy of height of each of the circles 72a to 72p from the level of an imaginary sided upper surface 73a positioned on the left side on the screen (the above accuracy will be referred to as "height accuracy" of convex portion designed for shaping optical fiber fitting portion).

When the above-obtained shaping molds (10 in total) were measured for the above accuracy data five times each, all the convex portions designed for shaping optical fiber fitting portions had an accumulated pitch $L_1$ to $L_{15}$ accuracy in the range of from +0.40 μm to −0.44 μm and had a height accuracy of within ±0.5 μm.

The above convex portions designed for shaping optical fiber fitting portions were formed at a pitch of 127 μm (designed value). The accumulated pitches $L_1$ to $L_{15}$ in designing are therefore represented by $L_n = 127 \times (n-1)$ μm (n indicates a circle counted by numbering the circles in the imaginary optical fiber fitting portions from the left side, e.g., $L_1$ indicates the circle 72a and $L_{16}$ indicates the circle 72p.

(C) Preparation of Optical Fiber Guide Block and Measurement for Accuracy

A release film was formed on the shaping surface of one (arbitrary selected) of the shaping molds obtained in the above (A), to obtain a lower mold member. The release film had a thickness of 500 to 2,000 Å. Further, a sleeve mold member (coated with a release film) and an upper mold member (coated with a release film) were prepared for use in combination with the above lower mold member, and preforms were also prepared. The preforms were formed of a silicate glass having a glass transition temperature of 470° C., a sag temperature of 510° C. and an average thermal expansion coefficient of $60 \times 10^{-7}$/° C. in a temperature range of from room temperature to 400° C.

Optical fiber guide blocks were prepared as follows. A preform was mold-shaped into an optical fiber guide block by a mold shaping method using the above lower mold member, the above sleeve mold member and the above upper mold member at a shaping temperature of 550° C. under a shaping pressure of 150 kgf/cm². In the above mold-shaping, the lower mold member was arranged such that one end of each of the elevated portion and the convex portions designed for shaping optical fiber fitting portions (any one of two such sides of the lower mold member) was positioned on the side where an optical connection end surface of the optical fiber guide block to be shaped was positioned.

The above mold-shaping was repeated to obtain 100 optical fiber guide blocks. These optical fiber guide blocks had forms analogous to the form of the optical fiber guide block 25 shown in FIG. 4 except for the number of optical fiber fitting portions.

The above optical fiber guide blocks were measured for accuracy data with the same measuring apparatus as that used in the above (B) in the following manner.

An optical fiber guide block was scanned with the tracer of the above apparatus in the direction at right angles with the length direction of the optical fiber fitting portions, to determine contour coordinates of the surfaces of one sided upper surface to the other sided upper surface, and a contour form of scanned portions was shown on a screen of a display.

Then, circles corresponding to quartz-based single-mode optical fibers having a diameter of 125 μm were one by one inserted in optical fiber fitting-portions to determine coordinates of centers of the circles when each of the circles was in contact with two inclined surfaces (inner side walls) of the corresponding optical fiber fitting portions.

The above coordinates of the centers were used to determine an accuracy of distances from the center of the circle in the optical fiber fitting portion positioned on the leftmost side on the screen to the centers of the remaining 15 circles (these distances will be referred to as "accumulated pitch" of optical fiber fitting portion) and an accuracy of height of each of the circles from the level of the sided upper surface positioned on the left side on the screen (the above accuracy will be referred to as "height accuracy" of optical fiber fitting portion).

All the optical fiber guide blocks (100 pieces) were measured for the above accuracy data five times each. One arbitrary optical fiber guide block which was selected had an accumulated pitch accuracy of within ±0.3 μm with regard to all of the optical fiber fitting portions thereof and had a height accuracy of within ±0.5 μm with regard to all of the optical fiber fitting portions thereof.

Further, more than 90% of the optical fiber guide blocks had an accumulated pitch accuracy of within ±0.5 μm with regard to all of the optical fiber fitting portions of each and had a height accuracy of within ±0.5 μm with regard to all of the optical fiber fitting portions of each. The above percentage will be referred to as "good product ratio" hereinafter.

Comparative Example 1

(A) Preparation of Shaping Mold

After the step of forming convex portions was carried out under the same conditions as those in (1) of Example 1, circumferential regions were formed under the same conditions as those in (2) of Example 1 except that the shift amount of side surface of an elevated portion on the side of circumferential region a (see Example 1) from the bottom of the V groove on the leftmost side was changed to 0 (designed value) and that the shift amount of side surface of an elevated portion on the side of circumferential region b (see Example 1) from the bottom of the V groove on the rightmost side was changed to 0 (designed value). In this manner, 10 shaping molds were prepared.

Figure 13:
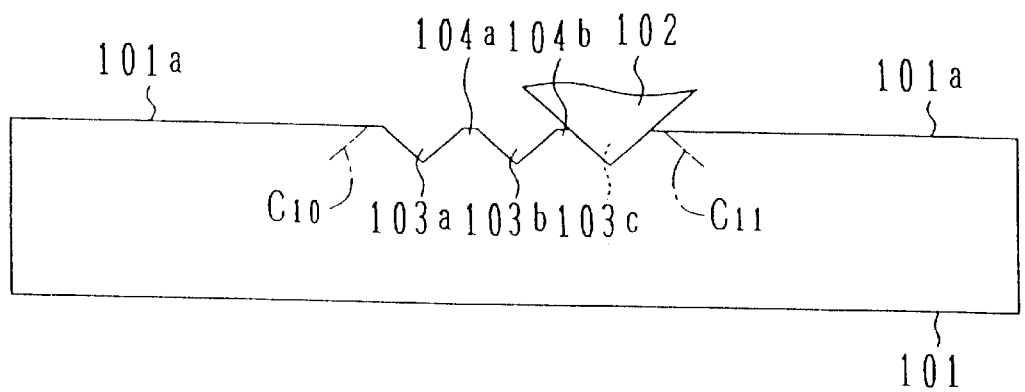
FIGS. 13(a), 13(b) and 13(c) show the steps of producing a shaping mold with one grinder with a high productivity.
Figure 13:
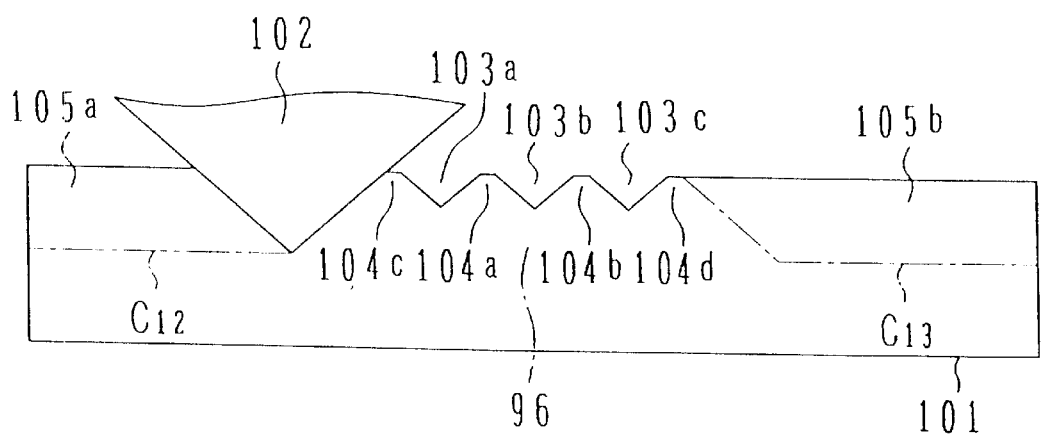
Figure 13:
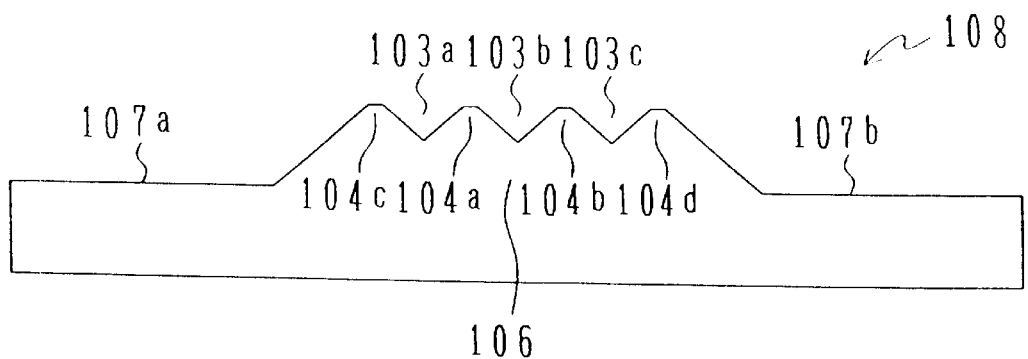

The above shaping molds had a form analogous to the form of the shaping mold 108 shown in FIG. 13.

(B) Measurement of Accuracy of Shaping Mold

The shaping molds were measured for accuracy data under the same conditions as those in (B) of Example 1.

In each shaping mold, all the convex portions designed for shaping optical fiber fitting portions had an accumulated pitch $L_1$ to $L_{15}$ accuracy in the range of from +0.35 μm to −0.50 μm and had a height accuracy of within ±0.5 μm.

(C) Preparation of Optical Fiber Guide Block and Measurement of Accuracy

A release film was formed on the upper surface of one (arbitrarily selected) of the shaping molds obtained in the above (A), in the same manner as in Example 1, and more than 100 optical fiber guide blocks were prepared under the same conditions as those in (C) of Example 1 except that the lower mold member was replaced with the above shaping mold.

The above optical fiber guide blocks were measured for accumulated pitch accuracy data of their optical fiber fitting portions and height accuracy data of their individual optical fiber fitting portions.

In all the optical fiber guide blocks, the accumulated pitch accuracy between the leftmost optical fiber fitting portion and any one of the optical fiber fitting portions on the right thereto and the accumulated pitch accuracy between the leftmost optical fiber fitting portion and the rightmost optical fiber fitting portion were poor as compared with data between any two optical fiber fitting portions different from the leftmost and rightmost optical fiber fitting portions. Further, in all the optical fiber guide blocks, the height accuracy in the rightmost optical fiber fitting portion and the height accuracy in the leftmost optical fiber fitting portion were poor as compared with data in any optical fiber fitting portions different from the leftmost and rightmost optical fiber fitting portions. The good product ratio with regard to the above optical fiber guide block was therefore several percent.

EXAMPLE 2

(A) Preparation of Shaping Mold

After the step of forming convex portions was carried out under the same conditions as those in (1) of Example 1, circumferential regions were formed under the same conditions as those in (2) of Example 1 except that the double tapered grinder was replaced with a flat grinder and that the shift amount of side surface of an elevated portion on the side of circumferential region a (see Example 1) from the bottom of the V groove on the leftmost side and the shift amount of side surface of an elevated portion on the side of circumferential region b (see Example 1) from the bottom of the V groove on the rightmost side were changed to 20 μm each (designed value). In this manner, 10 shaping molds were prepared.

The above shaping molds had a form analogous to the form of the shaping mold 40 shown in FIG. 6.

(B) Measurement of Accuracy of Shaping Mold

The above shaping molds were measured for accuracy data under the same conditions as those in (B) of Example 1.

In each shaping mold, all the convex portions designed for shaping optical fiber fitting portions had an accumulated pitch $L_1$ to $L_{15}$ accuracy in the range of ±05 μm and had a height accuracy of within ±0.5 μm.

(C) Preparation of Optical Fiber Guide Block and Measurement of Accuracy

A release film was formed on the upper surface of one (arbitrarily selected) of the shaping molds obtained in the above (A), in the same manner as in Example 1, and more than 100 optical fiber guide blocks were prepared under the same conditions as those in (C) of Example 1 except that the lower mold member was replaced with the above arbitrarily selected one of the above-prepared shaping molds. The above optical fiber guide block had a form analogous to the form of the optical fiber guide block 55 shown in FIG. 7 except that the number of the optical fiber guide blocks, etc., were changed.

The above optical fiber guide blocks were measured for accumulated pitch accuracy data of their optical fiber fitting portions and height accuracy data of their individual optical fiber fitting portions in the same manner as in (C) of Example 1.

The good product ratio of the above optical fiber guide block was at least 90%.

However, since the shaped products (optical fiber guide blocks) had a higher thermal expansion coefficient than the molds, and since the side surfaces of the elevated portion on the sides of circumferential regions a and b (see Example 1) were both perpendicular, it was difficult to release each shaped product (optical fiber guide block) from the mold, and some shaped products were liable to undergo cracking or breaking.

EXAMPLE 3

(A) Preparation of Shaping Mold

Ten shaping molds were prepared in the same manner as in (A) of Example 2 except that the shift amount of side surface of an elevated portion on the side of circumferential region a (see Example 1) from the bottom of the V groove on the leftmost side and the shift amount of side surface of an elevated portion on the side of circumferential region b (see Example 1) from the bottom of the V groove on the rightmost side were changed to 0 each (designed value).

The above shaping molds had a form analogous to the form of the shaping mold 48 shown in FIG. 8.

(B) Measurement of Accuracy of Shaping Mold

The above shaping molds were measured for accuracy data under the same conditions as those in (B) of Example 1.

In each shaping mold, all the convex portions designed for shaping optical fiber fitting portions had an accumulated pitch $L_1$ to $L_{15}$ accuracy in the range of ±05 μm and had a height accuracy of within ±0.5 μm.

(C) Preparation of Optical Fiber Guide Block and Measurement of Accuracy

A release film was formed on the upper surface of one (arbitrarily selected) of the shaping molds obtained in the above (A), in the same manner as in Example 1, and more than 100 optical fiber guide blocks were prepared under the same conditions as those in (C) of Example 1 except that the lower mold member was replaced with the above arbitrarily selected one of the above-prepared shaping molds. The above optical fiber guide block had a form analogous to the form of the optical fiber guide block 65 shown in FIG. 9 except that the number of the optical fiber guide blocks, etc., were changed.

The above optical fiber guide blocks were measured for accumulated pitch accuracy data of their optical fiber fitting portions and height accuracy data of their individual optical fiber fitting portions in the same manner as in (C) of Example 1.

As a result, it was found that the leftmost optical fiber fitting portion and the rightmost optical fiber fitting portion of each of the optical fiber guide blocks were liable to be poor in height accuracy as compared with the other optical fiber fitting portions. The good product ratio in this Example was therefore lower that the good product ratio in Example 2, while it was higher than the good product ratio in Comparative Example 1.

For the same reasons as those in Example 2, it was difficult to release the shaped products (optical fiber guide blocks) from the molds, and some shaped products were liable to undergo cracking or breaking.

EXAMPLE 4

(A) Preparation of Shaping Mold

After the step of forming convex portions was carried out under the same conditions as those in (1) of Example 1, circumferential regions were formed under the same conditions as those in (2) of Example 1 except that the shift amount of side surface of an elevated portion on the side of circumferential region a (see Example 1) from the bottom of the V groove on the leftmost side and the shift amount of side surface of an elevated portion on the side of circumferential region b (see Example 1) from the bottom of the V groove on the rightmost side were changed to 63.5 μm (½ of V groove-V groove pitch, designed value). In this manner 10 shaping molds were prepared.

The above shaping molds had a form similar to the form of the shaping mold 108 shown in FIG. 13 except that the number of the optical fiber fitting portions, etc., were changed. Each shaping mold apparently had 18 convex portions designed for shaping optical fiber fitting portions. In each shaping mold, however, the optical fiber fitting portions which were positioned on the leftmost side and right most sides when the elevated portion was viewed as front view were to be considered secondary convex portions. Therefore, each shaping mold had 16 convex portions designed for shaping optical fiber fitting portions.

(B) Measurement of Accuracy of Shaping Mold

The above shaping molds were measured for accuracy data under the same conditions as those in (B) of Example 1.

In each shaping mold, all the convex portions designed for shaping optical fiber fitting portions had an accumulated pitch $L_1$ to $L_{15}$ accuracy and a height accuracy equivalent to those in Example 1.

(C) Preparation of Optical Fiber Guide Block and Measurement of Accuracy

A release film was formed on the upper surface of one (arbitrarily selected) of the shaping molds obtained in the above (A), in the same manner as in Example 1, and more than 100 optical fiber guide blocks were prepared under the same conditions as those in (C) of Example 1 except that the lower mold member was replaced with the above arbitrarily selected one of the above-prepared shaping molds.

The above optical fiber guide blocks were measured for accumulated pitch accuracy data of their optical fiber fitting portions and height accuracy data of their individual optical fiber fitting portions in the same manner as in (C) of Example 1.

As a result, the optical fiber guide blocks showed that the accumulated pitch L1 to L15 accuracy data of their optical fiber fitting portions, height accuracy data of their optical fiber fitting portions and good product ratios were equivalent to those in Example 1.

EXAMPLE 5

(A) Preparation of Shaping Mold

After the step of forming convex portions was carried out under the same conditions as those in (1) of Example 1, the step of forming circumferential regions was carried out as follows, to produce 10 shaping molds.

Two 121 μm deep (designed value) grooves were formed with the same double tapered grinder as that used in the above step of forming convex portions, such that the shift amount of side surface of an elevated portion on the side of circumferential region a (see Example 1) from the bottom of the V groove on the leftmost side and the shift amount of side surface of an elevated portion on the side of circumferential region b (see Example 1) from the bottom of the V groove on the rightmost side were 15 μm each (designed value). Then, remaining portions of the regions A and B (see Example 1) were removed with a flat grinder such that circumferential regions were to have their upper surfaces at a level at which the bottom of the above two grooves (depth 121 μm (designed value)) were positioned. As a result, the intended circumferential regions were formed.

The above-prepared shaping molds had a form similar to the form of the shaping mold obtained in Example 1.

(B) Measurement of Accuracy of Shaping Mold

The above shaping molds were measured for accuracy data under the same conditions as those in (B) of Example 1.

In each shaping mold, all the convex portions designed for shaping optical fiber fitting portions had an accumulated pitch $L_1$ to $L_{15}$ accuracy and a height accuracy equivalent to those in Example 1.

(C) Preparation of Optical Fiber Guide Block and Measurement of Accuracy

A release film was formed on the upper surface of one (arbitrarily selected) of the shaping molds obtained in the above (A), in the same manner as in Example 1, and more than 100 optical fiber guide blocks were prepared under the same conditions as those in (C) of Example 1 except that the lower mold member was replaced with the above arbitrarily selected one of the shaping molds.

The above optical fiber guide blocks were measured for accumulated pitch accuracy data of their optical fiber fitting portions and height accuracy data of their individual optical fiber fitting portions in the same manner as in (C) of Example 1.

As a result, the optical fiber guide blocks showed that the accumulated pitch accuracy $L_1$ to $L_{15}$ data of their optical fiber fitting portions, height accuracy data of their optical fiber fitting portions and good product ratios were equivalent to those in Example 1.

EXAMPLE 6

Preparation of Optical Fiber Array

The optical fiber guide blocks obtained in Examples 1 to 4, optical fibers having an outer diameter of 125 μm (designed value) and pressing member formed of glass having a predetermined form (e.g., plate-shaped) were used to prepare optical fiber arrays as follows.

First, an adhesive (e.g., photo-curable adhesive) was applied to the optical fiber fitting portions of an optical fiber guide block, and then, end portions of the optical fibers (16 optical fibers) were fitted in the optical fiber fitting portions. Then, an adhesive (e.g., photo-curable adhesive) was further applied to circumferential surfaces of the optical fiber end portions fitted in the optical fiber fitting portions. Then, while the optical fiber end portions fitted in the optical fiber fitting portions were pressed toward the optical fiber guide block with the pressing member, the above adhesive was cured. Further, after the adhesive was cured, the surface to be used as an optical connection end surface was polished to have a predetermined angle. In this manner, optical fiber arrays as end products were obtained.

The above optical fiber array used the optical fiber guide blocks obtained in Examples 1 to 4, and these optical fiber guide blocks permitted highly accurate positioning and fixing of all of the 16 optical fibers.

In the above optical fiber arrays, therefore, all of the 16 optical fibers were highly accurately positioned and fixed. As a result, when the optical fibers of the above optical fiber arrays were optically connected to 16-port optical waveguide arrays having the same refractive index and the same mode field diameter as those of the optical fibers, the positional deviation of even the outermost two optical fibers in each optical fiber array was very small, and the connection losses in all of optical connection sites (ports) were as small as 0.2 dB or less.

In the optical fiber array using the optical fiber guide block obtained in Example 1, particularly, the side surfaces of the side regions which side surfaces faced the optical fiber fitting portions formed a descent toward the optical fiber fitting portion side, and the distance between the sided upper surfaces on the right and left sides were large, so that the optical fibers were easily fitted in the optical fiber fitting portions without damaging the circumferential surfaces of the optical fibers.

What is claimed is:

1. A shaping mold having transfer shaping surfaces for producing an optical fiber guide block having a plurality of optical fiber fitting portions in the form of grooves formed in parallel and a side region in the vicinity of a region where the optical fiber fitting portions are formed, the shaping mold having the transfer shaping surfaces comprising an elevated region and a circumferential region adjacent to the elevated region, the elevated region having a first plurality of convex portions designed for shaping the optical fiber fitting portions and having a side surface forming a boundary with the circumferential region, the boundary being positioned at a level below the level of bottoms of grooves formed between one convex portion and another convex portion, said side surface being an additional side surface different from side surfaces of any convex portions designed for shaping optical fiber fitting portions, the elevated region having a secondary convex projecting portion positioned along side surfaces of the convex portions designed for shaping the optical fiber fitting portions, the secondary convex projecting portion having two side surfaces, one of said two side surfaces being located next to the side surface of an outermost convex portion designed for shaping an optical fiber fitting portion and another of said two side surfaces constituting the additional side surface, the circumferential region extending from the additional side surface in a direction opposite to a direction toward the outermost convex portion, the outermost convex portion of said first convex portions having a smaller horizontal distance from the secondary convex projecting portion than a horizontal distance from a convex portion of said first convex portions adjacent to the outermost convex portion.

2. The shaping mold of claim 1, which has two circumferential regions formed on both sides of the elevated region and positioned substantially at one level.

3. A process for the production of a shaping mold having transfer shaping surfaces for producing an optical fiber guide block having a plurality of optical fiber fitting portions in the form of grooves and side portions in the vicinities of a region where the optical fiber fitting portions are formed, the process comprising the steps of:

forming a plurality of first convex portions in an elevated region in a mold material, the first convex portions having side surfaces and being designed for transfer-shaping the optical fiber fitting portions, and an outermost first convex portion of the first convex portions being a convex portion that is to constitute a secondary convex projecting portion, and forming a circumferential region adjacent the elevated region, which elevated region is formed concurrently with the formation of the circumferential region, in the mold material including forming an additional side surface of the elevated region, which additional side surface is different from side surfaces of remaining first convex portions, the step of forming the circumferential region further including forming a boundary with the additional side surface at a level below the level of bottoms of grooves formed between said remaining first convex portions and forming said circumferential region extending in a direction away from said convex portions; and further including forming the secondary convex projecting portion along a side surface of an adjacent convex portion of the first convex portions;

the secondary convex projecting portion having a first side surface next to a side surface of said adjacent convex portion of said first convex portions and a second surface constituting said additional side surface; and forming a smaller horizontal distance between the secondary convex projecting portion and the adjacent convex portion of said first convex portions than a horizontal distance between adjacent convex portions of said first convex portions.

4. The process of claim 3, wherein the step of forming the circumferential region is carried out to form two circumferential regions which are on both sides of the elevated region and positioned substantially at one level.

5. A process for the production of an optical fiber guide block having a region of a plurality of optical fiber fitting portions in the form of grooves and a side region adjacent to the region of the optical fiber fitting portions, the optical fiber fitting portions having boundaries between one optical fiber fitting portion and another optical fiber fitting portion, the boundaries having peaks or peak surfaces at a level below the level of the side region edge on the side of the region of the optical fiber fitting portions, the side region having an additional side surface which is different from any optical-fiber-supporting side surfaces of the optical fiber fitting portions and which is on the side of the region of the optical fiber fitting portions, the process comprising the steps of:

providing a shaping mold having transfer shaping surfaces for producing an optical fiber guide block having a plurality of optical fiber fitting portions in the form of grooves formed in parallel and a side region in the vicinity of a region where the optical fiber fitting portions are formed, the shaping mold having the transfer shaping surfaces comprising an elevated region and a circumferential region adjacent to the elevated region, the elevated region having a plurality of convex portions designed for shaping the optical fiber fitting portions and having a side surface forming a boundary with the circumferential region, the boundary being positioned at a level below the level of bottoms of grooves formed between one convex portion and another convex portion, said side surface being an additional side surface different from side surfaces of any convex portions designed for shaping optical fiber fitting portions, the elevated region having a secondary convex projecting portion positioned along side surfaces of the convex portions designed for shaping the optical fiber fitting portions, the secondary convex projecting portion having two side surfaces, one of said two side surfaces being located next to the side surface of an outermost convex portion designed for shaping an optical fiber fitting portion and another of said two side surfaces constituting the additional side surface, the circumferential region extending from the additional side surface in a direction opposite to a direction toward the outermost convex portion; the secondary convex projecting portion adjacent said plurality of convex portions forming a smaller horizontal distance between the secondary convex projecting portion and said outermost convex portion than a horizontal distance between adjacent convex portions of said plurality of convex portions; and mold shaping a shapeable material into the optical fiber guide block using the elevated region and circumferential region of the shaping mold to form the region of a plurality of optical fiber fitting portions in the form of grooves and a side region adjacent to the region of the optical fiber fitting portions of the optical fiber guide block.

6. The process of claim 5, wherein the step of mold shaping is carried out by forming two side regions which are adjacent to the region of the optical fiber fitting portions and have upper surfaces positioned at one level.

7. The process of claim 5, wherein the shapeable material is a preform formed of glass.

8. The shaping mold of claim 1 wherein adjacent convex portions terminate in an apex at the bottom of the groove therebetween.

9. The shaping mold of claim 1 wherein the additional side surface of the secondary convex portion is parallel to the side surface of the convex portion closest to the circumferential region.

* * * * *